United States Patent
Hashizume

(10) Patent No.: US 7,352,148 B2
(45) Date of Patent: Apr. 1, 2008

(54) DEVICE AND METHOD FOR CONTROLLING OPTICAL AXIS OF HEADLAMPS

(75) Inventor: Takenori Hashizume, Ayase (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/510,833

(22) Filed: Aug. 25, 2006

(65) Prior Publication Data

US 2007/0046239 A1 Mar. 1, 2007

(30) Foreign Application Priority Data

| Aug. 26, 2005 | (JP) | ............................ 2005-245679 |
| Oct. 6, 2005 | (JP) | ............................ 2005-293288 |
| Feb. 10, 2006 | (JP) | ............................ 2006-033532 |

(51) Int. Cl.
*G05B 19/33* (2006.01)
(52) U.S. Cl. ............................ 318/575; 362/40; 362/43
(58) Field of Classification Search ............... 318/575, 318/488, 489, 286, 466; 362/40, 43; 307/101
See application file for complete search history.

(56) References Cited

U.S. PATENT DOCUMENTS

| 5,410,456 | A   * | 4/1995  | Shibata et al. ................ 362/40 |
| 6,652,110 | B2 * | 11/2003 | Hayami ........................ 362/40 |
| 6,688,760 | B2 * | 2/2004  | Horiuchi ..................... 362/464 |
| 7,239,951 | B2 * | 7/2007  | Sugimoto et al. ............. 701/49 |
| 7,246,021 | B2 * | 7/2007  | Morishita .................... 702/95 |
| 2002/0163795 | A1 * | 11/2002 | Uchida ........................ 362/40 |
| 2003/0067763 | A1 * | 4/2003  | Fukawa ....................... 362/40 |
| 2006/0028832 | A1 * | 2/2006  | Horii et al. ................. 362/514 |

FOREIGN PATENT DOCUMENTS

JP 2002-326534 11/2002

* cited by examiner

*Primary Examiner*—Lincoln Donovan
*Assistant Examiner*—Antony M. Paul
(74) *Attorney, Agent, or Firm*—Young Basile

(57) ABSTRACT

An optical axis controller and method for headlamps for a vehicle where the swiveling lamps are not driven due to the minute steering operation of the driver. The steering angle of the steering wheel is detected by using, for example, a steering angle signal from a steering angle sensor. A desired light emission direction is computed based on the steering angle and a hysteresis value and the lamps are driven to an actual light emission direction matching the desired light emission direction.

43 Claims, 34 Drawing Sheets

DEVICE AND METHOD FOR CONTROLLING OPTICAL AXIS OF HEADLAMPS

CROSS-REFERENCES TO RELATED APPLICATIONS

This application claims priority from Japanese Patent Application Serial No. 2005-245679, filed on Aug. 26, 2005, No. 2005-293288, filed on Oct. 6, 2005, and No. 2006-033532, filed on Feb. 10, 2006, each of which is incorporated herein in its entirety by reference.

TECHNICAL FIELD

The present invention pertains in general to a device and method for controlling an optical axis of headlamps.

BACKGROUND

There are known devices for controlling vehicle headlamps. For example, in Japanese Kokai Patent Application No. 2002-326534, a steering angle sensor detects the steering direction of the vehicle and outputs a stepwise varying signal. The average of the steering angles detected by the steering angle sensor in multiple recent detection iterations is used to control the deflection angle of the headlamps.

BRIEF SUMMARY OF THE INVENTION

In one optical axis controller taught herein, the controller includes a steering angle detecting device operable to detect a steering angle, a driving device operable to adjust a light emission direction of the at least one headlamp and a control unit operable to compute a desired light emission direction for the headlamps based on the steering angle and a hysteresis value and to control an actual light emission direction of the at least one headlamp to match the desired light emission direction using the driving device.

Methods of controlling an optical axis of at least one headlamp of a vehicle are also taught herein. One such method includes detecting a steering angle of the vehicle, computing a desired light emission direction of the at least one headlamp based on the steering angle and a hysteresis value and controlling an actual light emission direction of the at least one headlamp to match the desired light emission direction.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For the illumination device of vehicles such as that described in Japanese Kokai Patent Application No. 2002-326534, the steering angle sensor outputs the stepwise signal in increments of about 1° of the steering wheel angle, so that the swivel angle of the headlamps responds to even minute steering operations. This can cause the undesirable outcome of disconcerting the driver.

According to embodiments of the invention, the vehicle speed and steering angle are detected, the light emission direction of the headlamps is computed based on the vehicle speed and the steering angle as well as a prescribed hysteresis value, and the light emission direction of the headlamps is controlled according to the computed light emission direction. Hence, in addition to the vehicle speed and steering angle, a prescribed hysteresis value is also used as a reference in computing the light emission direction of the headlamps, and the headlamps are moved into that light emission direction. The headlamps are not moved according to minute steering operations by the driver. As a result, the driver does not feel disconcerted or confused by minute movements of the headlamps.

Figure 1:
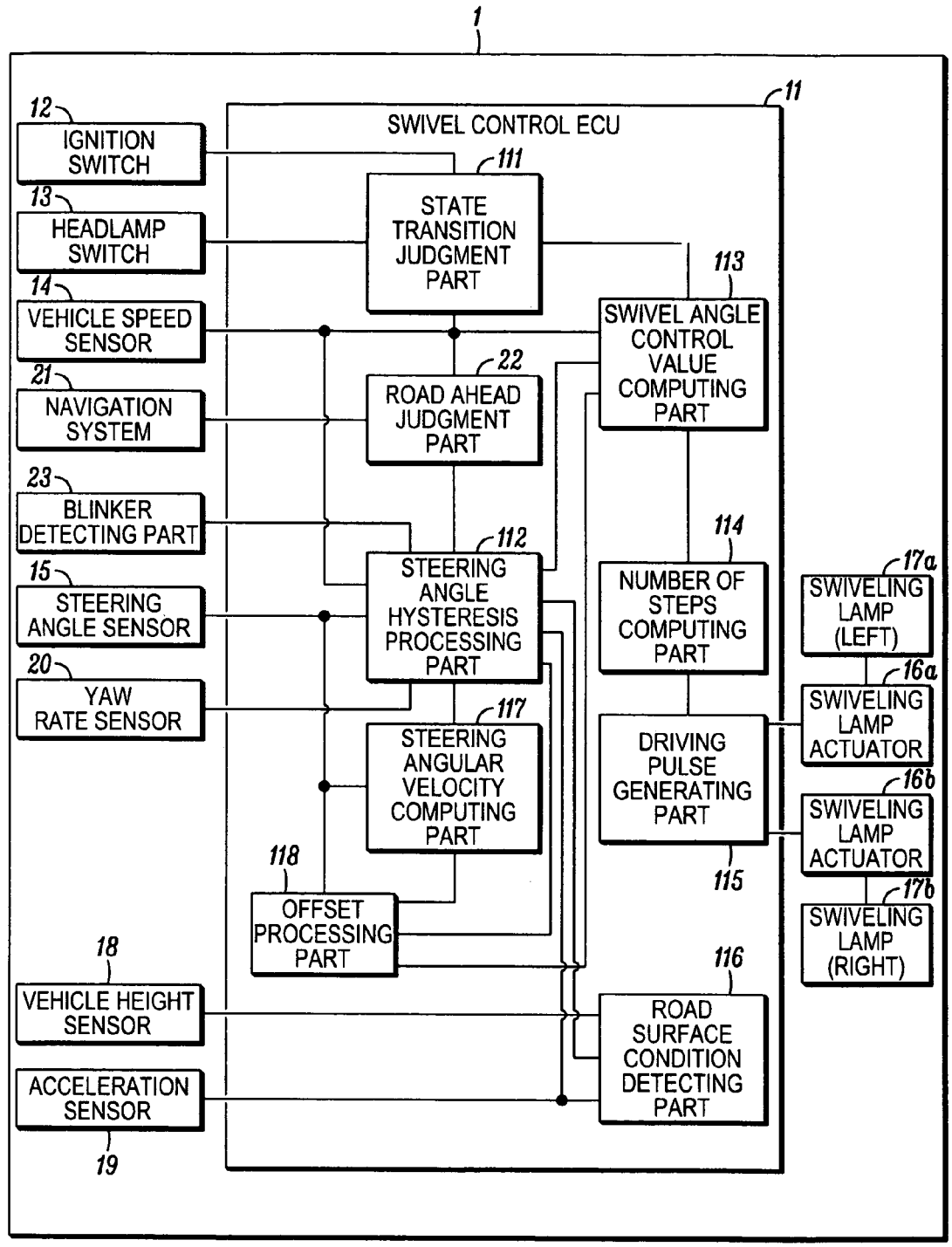
FIG. 1 is a block diagram illustrating a device for vehicle headlamps in accordance with a first embodiment.

FIG. 1 is a block diagram illustrating one embodiment of a vehicle headlamp device. This vehicle headlamp device 1 has swivel control ECU (Electronic Control Unit) 11, ignition switch 12, headlamp switch 13, vehicle speed sensor 14, steering angle sensor 15, vehicle height sensor 18, acceleration sensor 19, yaw rate sensor 20, blinker detecting part 23, swiveling lamp actuators (left/right) 16a, 16b for swiveling lamps (left/right) 17a, 17b and navigation system 21.

Figure 2:
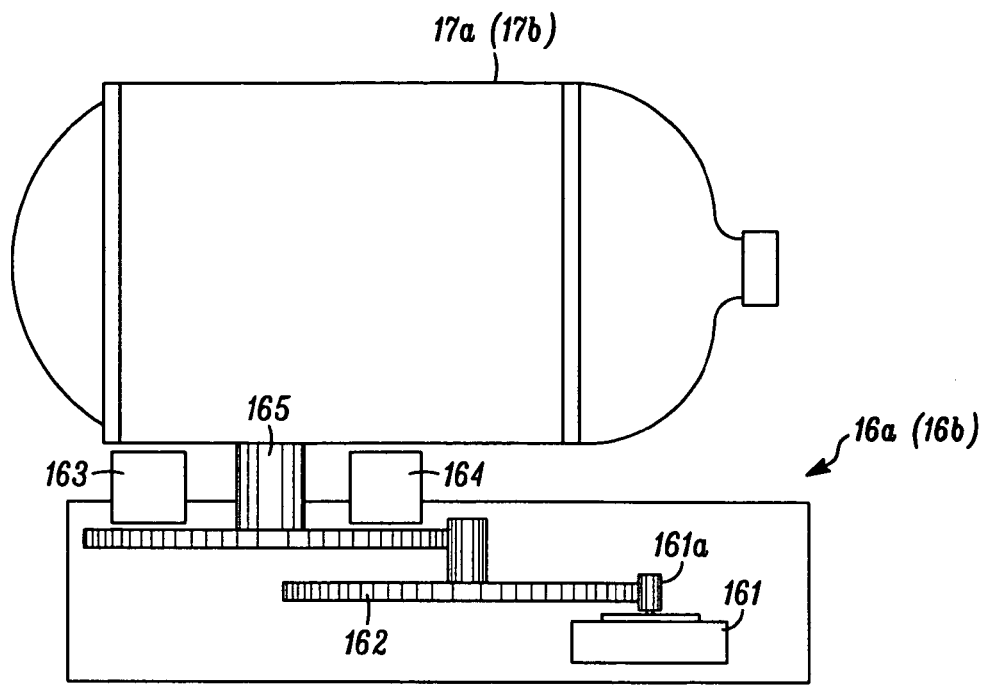
FIG. 2 is a diagram illustrating a swiveling lamp actuator in accordance with the first embodiment.

Swiveling lamp actuators 16a, 16b perform the function of driving the optical axis, that is, moving the light emission direction of swiveling lamps 17a, 17b used as left and right headlamps, respectively, in left/right directions. Swiveling lamp actuators 16a, 16b have the same structure, and the structure can be explained with reference to left-side swiveling lamp actuator 16a in FIGS. 2-4. As shown in FIG. 2, swiveling lamp actuator 16a has stepping motor 161, gear mechanism 162, position sensor 163, stepper 164 and rotating shaft 165.

Stepping motor 161 is a motor for converting pulse number to angular displacement. When an input pulse signal comes in, its rotor is rotated by a prescribed angle intrinsic to the motor. Consequently, the rotational angle of the rotor from the reference position is proportional to the number of input pulse signals. The driving pulses generated by driving pulse generating part 115, to be explained later, are input to stepping motor 161.

Gear mechanism 162 is a unit that has several groups of gears, engaged with each other sequentially, for transmitting the rotating movement of rotating output shaft 161a of stepping motor 161 to rotating shaft 165. This gear mechanism 162 enables reduction-geared rotational driving of rotating shaft 165.

Figure 3:
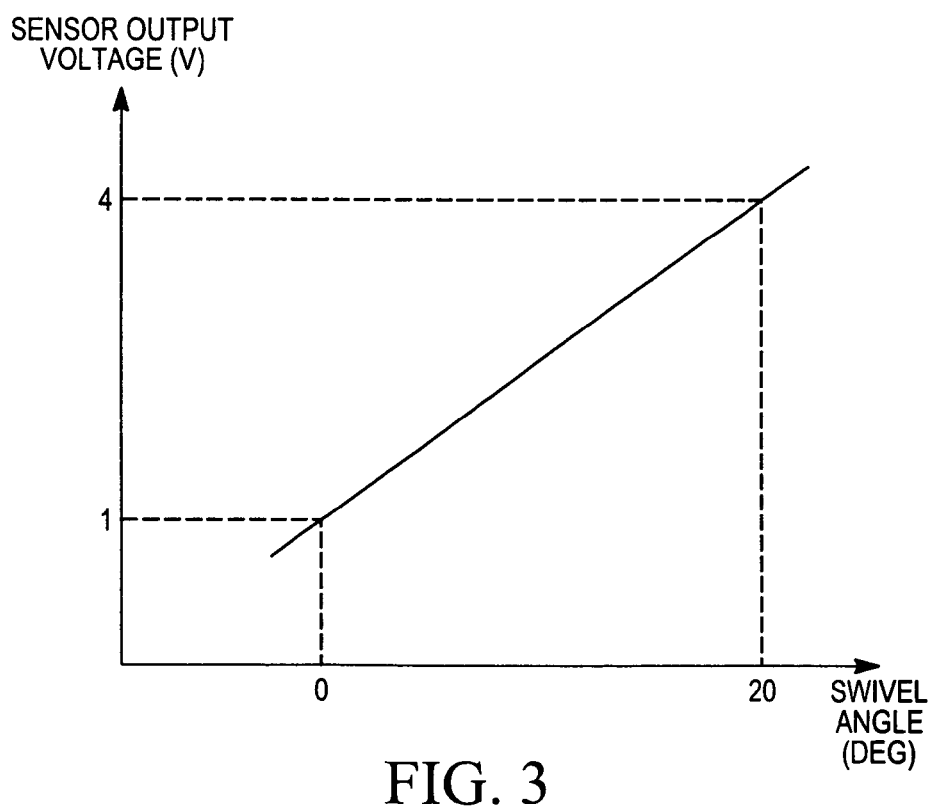
FIG. 3 is a graph illustrating the position sensor output voltage versus swivel angle characteristics in accordance with a first application example.

Position sensor 163 detects the swivel angle of swiveling lamp 17a and is made with a Hall sensor or the like. The relationship between the sensor output voltage of position sensor 163 and the swivel angle of swiveling lamp 17a is measured beforehand. The result, shown graphically in FIG. 3, is stored in swivel control ECU 11 as a sensor output voltage/swivel angle characteristic. Consequently, by using the sensor output voltage/swivel angle characteristic as a reference, it is possible to detect the swivel angle of swiveling lamp 17a from the sensor output voltage from position sensor 163.

Stepper 164 limits rotation of swiveling lamp 17a to a prescribed range. A protrusion (not shown) is formed on gear mechanism 162 or swiveling lamp 17a. If the rotation of swiveling lamp 17a tends to overrun the prescribed range, stepper 164 comes into contact with the protrusion so that rotation of swiveling lamp 17a beyond the prescribed range is prevented.

Rotating shaft 165 connects swiveling lamp 17a and gear mechanism 162, and the rotating drive of gear mechanism 162 rotates swiveling lamp 17a to a prescribed swivel angle position.

Figure 4:
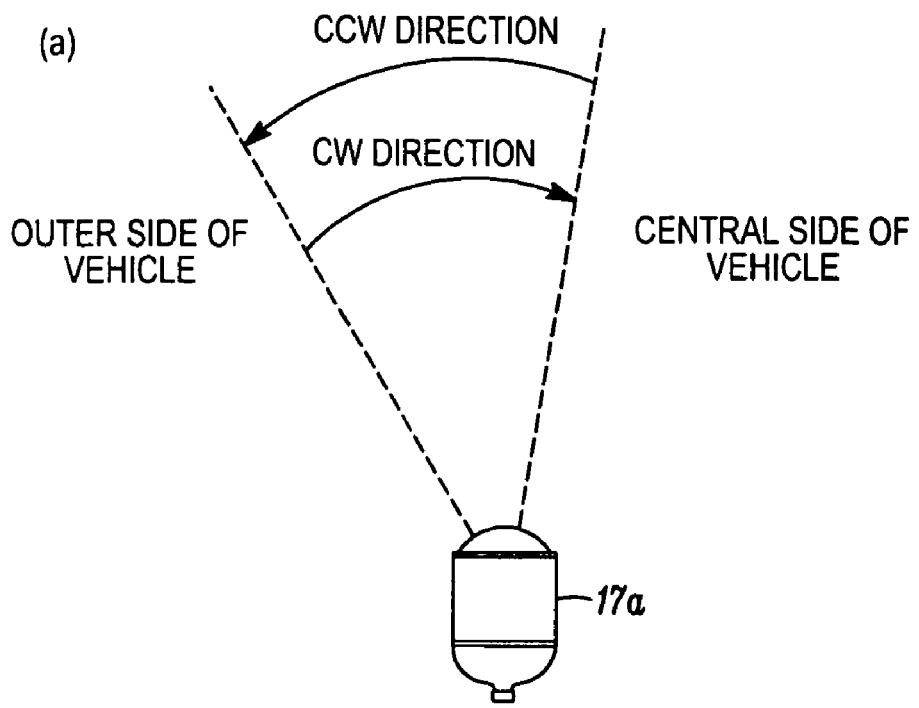
FIG. 4 is a diagram illustrating the relationship between the rotational direction of the rotating output shaft of the stepping motor and the rotational direction of the swiveling lamp in accordance with the first application example.
Figure 4:
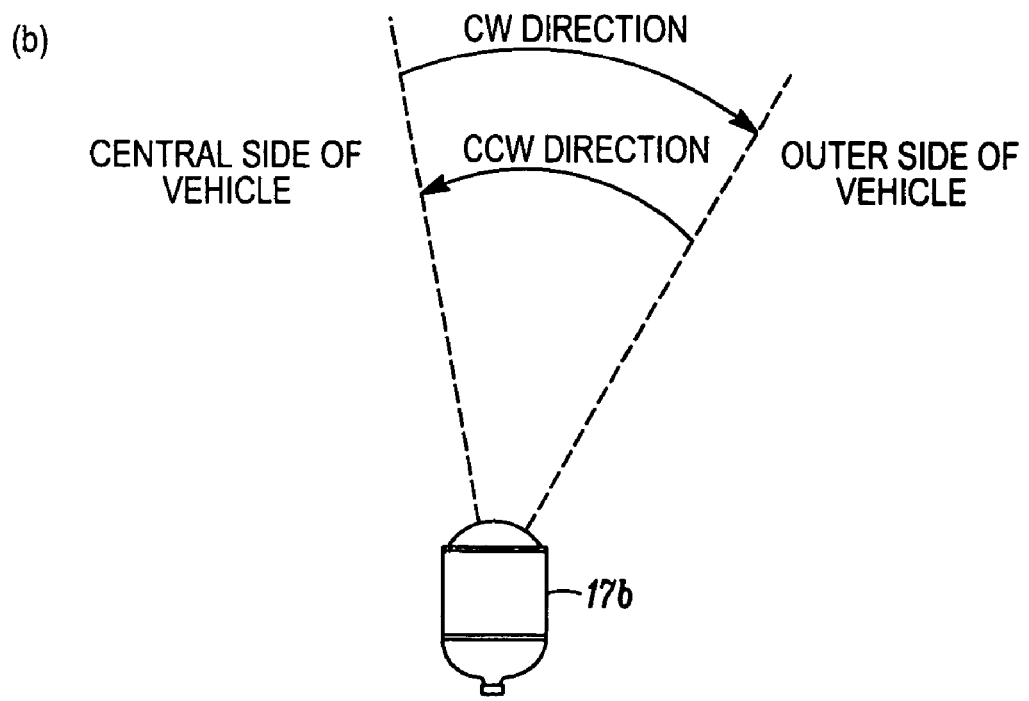

In the following, the relationship between the rotational direction of rotating output shaft 161a of stepping motor 161 and the rotational direction of swiveling lamps 17a, 17b will be explained with reference to FIG. 4. In FIG. 4, diagram (a) illustrates the left-side swiveling lamp 17a of a vehicle. The right-hand side of swiveling lamp 17a is the side toward the center of the vehicle, and the left-hand side is the outside of the vehicle. Diagram (b) serves to explain swiveling lamp 17b on the right-hand side of the vehicle. The right-hand side of swiveling lamp 17a is the outside of the vehicle, and the left-hand side is the side toward the center of the vehicle.

As shown in diagram (a) of FIG. 4, when rotating output shaft 161a of swiveling lamp actuator 16a on the left-hand side of the vehicle is rotated in the clockwise direction (CW direction), swiveling lamp 17a is rotated towards the center of the vehicle. On the other hand, when rotating output shaft 161a is rotated in the counter-clockwise direction (CCW direction), swiveling lamp 17a is rotated towards the outside of the vehicle.

As shown in diagram (b) of FIG. 4, for swiveling lamp actuator 16b on the right-hand side of the vehicle, when rotating output shaft 161a is rotated in the clockwise direction (CW direction), swiveling lamp 17b is rotated towards the outside of the vehicle. On the other hand, when rotating output shaft 161a is rotated in the counter-clockwise direction (CCW direction), swiveling lamp 17b is rotated towards the center of the vehicle. In this way, left/right swiveling lamp actuators 16a, 16b rotate the optical axis of each of left/right swiveling lamps 17a, 17b, thereby controlling the light emission direction.

Returning now to FIG. 1, navigation system 21 has a GPS unit and a map data storage part, for example, and it detects the vehicle's position in terms of the present position of the vehicle and the shape of the road relative to the running direction of the vehicle. The GPS unit is a device that detects the present position of the vehicle by receiving the GPS signals from GPS (Global Positioning System) communication satellites. The map data storage part stores the map data, which include path computing data for computing a recommended path, intersection names, road names and other path guiding data for guiding the vehicle to a destination along the recommended path, road data representing the road shape, background data that represent map shapes for coastal lines, rivers, railways, buildings, and other objects other than the roads, POI (Point Of Interest) data, etc.

Vehicle height sensor 18 is attached to each of the wheels of the vehicle, and each detects variation in the vehicle height and outputs a signal to swivel control ECU 11. Vehicle height sensor 18 can consist of a suspension displacement sensor that detects variation in the vehicle height from changes in the suspension or an ultrasonic sensor that beams ultrasonic waves onto the road surface and detects variation in the vehicle height from the reflection time for the ultrasonic waves. Acceleration sensor 19 detects the acceleration of the vehicle in the up/down direction and outputs the signal to swivel control ECU 11. Yaw rate sensor 20 detects the yaw rate of the vehicle and outputs the signal to swivel control ECU 11.

Swivel control ECU 11 is composed of a microcomputer and its peripheral circuits. It receives signals from ignition switch 12, headlamp switch 13, vehicle speed sensor 14, steering angle sensor 15, vehicle height sensor 18, acceleration sensor 19, yaw rate sensor 20, blinker detecting part 23, navigation system 21, etc., during each control period (for example, 10 ms) and outputs driving pulses to swiveling lamp actuators 16a, 16b. It also computes the steering angular velocity from variation in the steering angle detected by steering angle sensor 15. As shown in FIG. 1, swivel control ECU 11 has state transition judgment part 111, steering angle hysteresis processing part 112, swivel angle control value computing part 113, number of steps computing part 114, driving pulse generating part 115, road surface state detecting part 116, steering angular velocity computing part 117, road ahead judgment part 22 and offset processing part 118. Their operation is effected by means of software processing.

State transition judgment part 111 switches the mode of control of the swivel angle of swiveling lamps 17a, 17b in swivel control ECU 11 between a vehicle straight running direction movement mode and a swivel control mode. Here, the vehicle straight running direction movement mode is the mode in which the light emission direction of swiveling lamps 17a, 17b is in the vehicle straight running direction, and the swivel angle in this mode is 0°. On the other hand, the swivel control mode is the mode in which the light emission direction is changed based on the steering angle or the like of the steering wheel. In this mode, the swivel angle of swiveling lamps 17a, 17b is controlled to correspond to the steering angle or the like.

Figure 5:
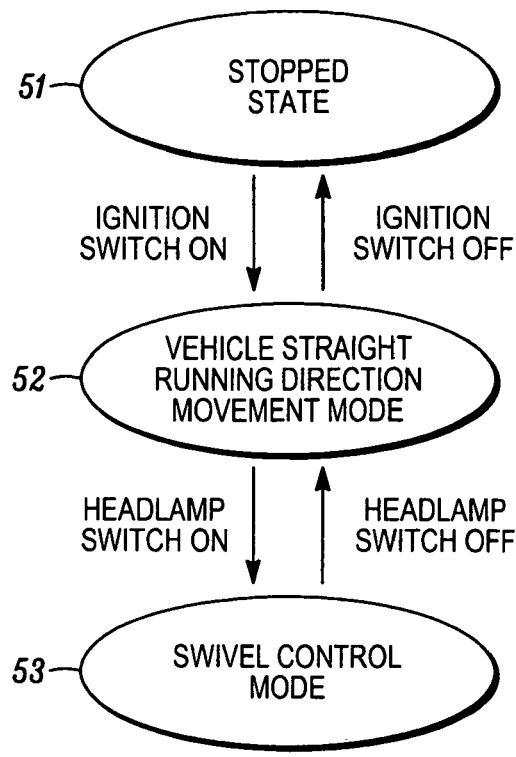
FIG. 5 is a diagram illustrating switching between the vehicle straight running direction movement mode and the swivel control mode in the state transition judgment part in accordance with the first application example.

In the following, switching between the vehicle straight running direction movement mode and the swivel control mode in state transition judgment part 111 will be explained with reference to FIG. 5. When state transition judgment part 111 receives the signal from ignition switch 12 that the ignition switch is ON, control of the swivel angle is switched from stopped state 51 to vehicle straight running direction movement mode 52. In this case, swiveling lamps 17a, 17b are driven so that light emission is in the vehicle straight running direction. That is, the swivel angle of swiveling lamps 17a, 17b becomes 0°.

After driving ends, when a signal received from headlamp switch 13 indicates that the headlamp switch is ON, switching is performed from the vehicle straight running direction movement mode 52 to swivel control mode 53. In this mode, based on the steering angle signal from steering angle sensor 15 and the vehicle speed signal from vehicle speed sensor 14, the swivel angle of swiveling lamps 17a, 17b is controlled so that the field of view in the steering direction of the vehicle is guaranteed.

Also, in swivel control mode 53, when the headlamp switch OFF signal is received, switching is performed from swivel control mode 53 to vehicle straight running direction movement mode 52. In addition, from vehicle straight running direction movement mode 52, control returns to stop state 51 when an ignition switch OFF signal is received.

Road ahead judgment part 22 receives the road data for the vicinity of the vehicle and the vehicle present position information from navigation system 21, and judges whether there is an upcoming curve in the running direction of the vehicle. Judgment concerning upcoming curves is performed based on the shape of the road, especially the radius of curvature of the road. For example, when the radius of curvature of the road in the running direction of the vehicle is smaller than 200 m, it is judged that there is a corner ahead of the vehicle. On the other hand, when the radius of curvature is 200 m or larger, it is judged that there is no corner ahead of the vehicle.

From the change between the steering angle detected in a current iteration and the steering angle detected by steering angle sensor 15 in the last iteration, steering angular velocity computing part 117 computes the steering angular velocity. The detected steering angular velocity is output to steering angle hysteresis processing part 112 and offset processing part 118.

Road surface state detecting part 116 receives the signals from vehicle height sensor 18 and acceleration sensor 19 and judges whether the vehicle is running on a substandard road. For example, if the quantity obtained by integrating the amount of variation in vehicle height detected by vehicle height sensor 18 over a prescribed time exceeds a prescribed value, the frequency with which the vehicle height value exceeds a prescribed threshold is measured. If the frequency exceeds a prescribed value, it is judged that the vehicle is running on a substandard road. Also, if the vehicle up/down movement detected by acceleration sensor 19 exceeds a prescribed value, it is judged that the vehicle is running on a substandard road. The detection result is output to steering angle hysteresis processing part 112.

Based on the steering angle signal from steering angle sensor 15, steering angle hysteresis processing part 112 computes the steering angle hysteresis processing value. Here, the steering angle hysteresis processing value is a parameter for computing the swivel angle control value. The swivel angle control value is used to control the swivel angle of swiveling lamps 17a, 17b. The computed steering angle hysteresis processing value is output to swivel angle control value computing part 113 or offset processing part 118.

Based on the steering angle detected by steering angle sensor 15 and the steering angular velocity computed by steering angular velocity computing part 117, offset processing part 118 performs offset processing for the steering angle hysteresis processing value computed using steering angle hysteresis processing part 112. Offset processing part 118 also computes the steering angle offset processing value. The computed steering angle offset processing value is output to swivel angle control value computing part 113. Details of the offset processing will be explained hereinafter.

Figure 6:
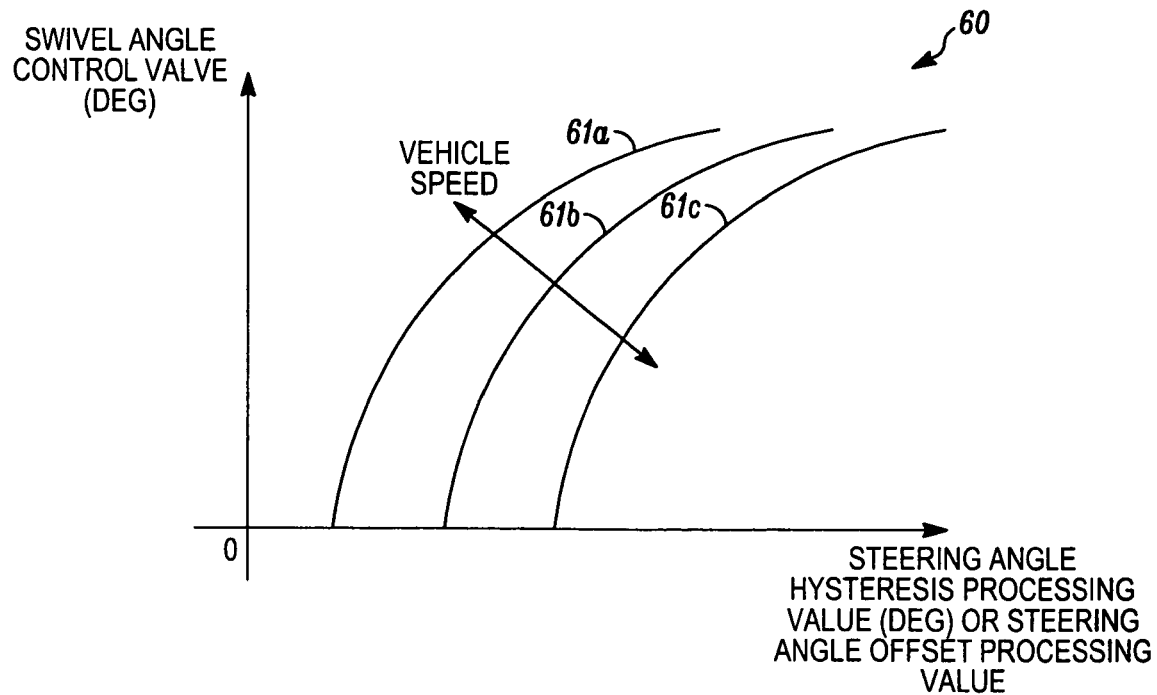
FIG. 6 is a graph illustrating the target swivel angle map in accordance with the first application example.

When the mode is switched to swivel control mode 23, swivel angle control value computing part 113 computes the swivel angle control value for swiveling lamps 17a, 17b from the vehicle speed detected by vehicle speed sensor 14 and the steering angle hysteresis processing value or steering angle offset processing value (hereinafter referred to as "steering angle hysteresis processing value or the like"). Target swivel angle map 60 shown in FIG. 6 is stored in swivel angle control value computing part 113. Target swivel angle map 60 represents the optimum swivel angle at the prescribed vehicle speed and steering angle hysteresis processing value or the like as target swivel angle curves 61a-61c. As can be seen from target swivel angle map 60 shown in FIG. 6, when the steering angle hysteresis processing value or the like increases, the swivel angle also increases. Based on the steering angle hysteresis processing value or the like and the vehicle speed, the swivel angle control value is computed from target swivel angle curves 61a-61c. The computed swivel angle control value is output to number of steps computing part 114.

Based on the swivel angle control value (step angle) output from swivel angle control value computing part 113, number of steps computing part 114 computes the number of steps for the stepping motor installed in each of swiveling lamp actuators 16a, 16b. Each swiveling lamp actuator 16a, 16b is driven to rotate for the computed number of steps, and swiveling lamps 17a, 17b are rotated to the computed swivel angle control value.

The number of steps is computed using the following formula.

Number of steps=steering angle/(resolution/gear ratio) (Equation 1)

Here, the resolution refers to the resolution of the stepping motor, and the gear ratio refers to the gear ratio of the gear mechanism installed in swiveling lamp actuators 16a, 16b. The computed number of steps is output to driving pulse generating part 115.

Driving pulse generating part 115 generates the driving pulses for driving the stepping motor. The generated driving pulses are output to swiveling lamp actuators 16a, 16b, and swiveling lamps 17a, 17b are rotated to match the swivel angle control value.

In the following, swivel angle control of swiveling lamps 17a, 17b in vehicle headlamp device 1 according to one example is explained with reference to FIGS. 11, 16, 24, 28, 17, and 21.

Figure 11:
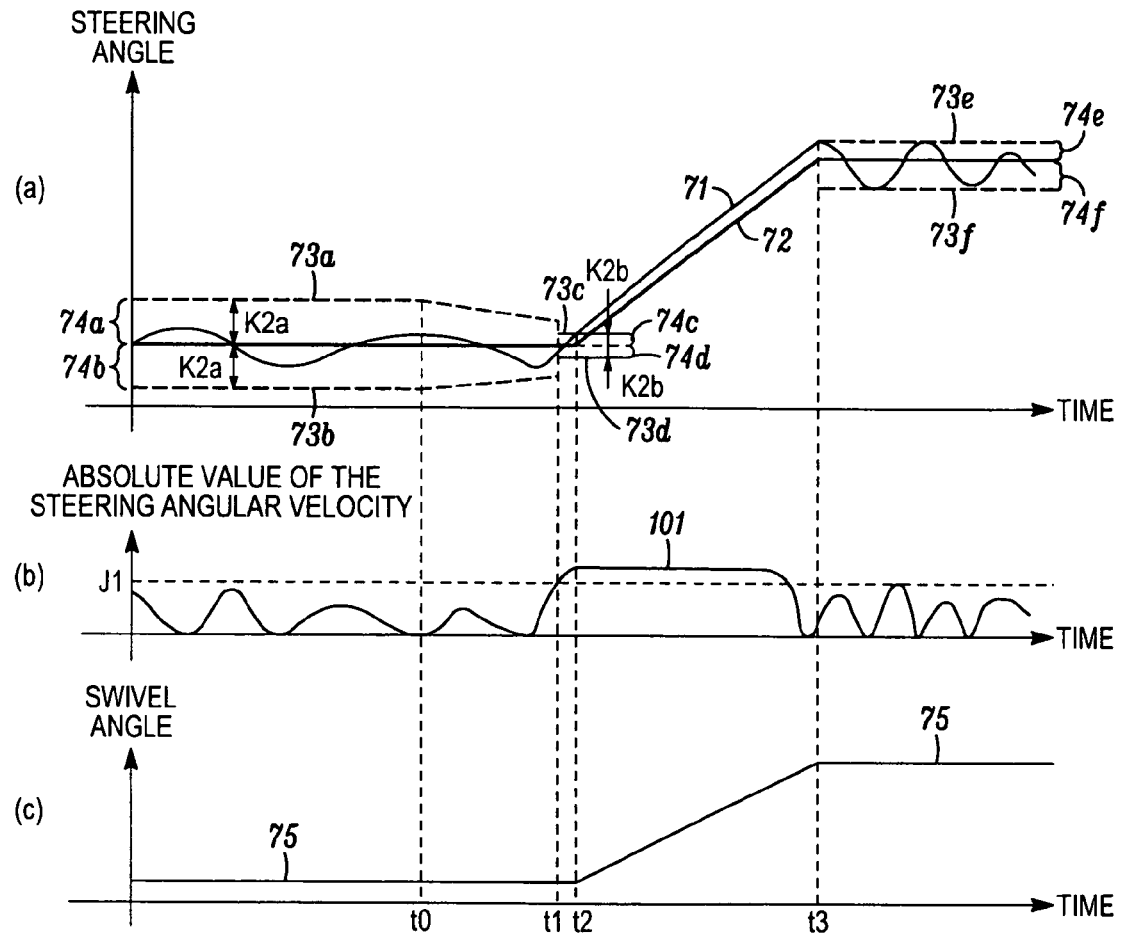
FIG. 11 includes graphs illustrating the swivel angle control for the swiveling lamp at the hysteresis value (defined value K2) shown in FIG. 10.

As shown in FIG. 11, the driver performs a minute steering operation, then rotates the steering wheel by a prescribed angle, and then performs another minute steering operation again. The graph (a) illustrates the steering angle of the steering wheel and the steering angle hysteresis processing value. Line 71 indicates the actual steering angle of steering wheel, and line 72 indicates the steering angle hysteresis processing value. The region between broken lines 73a and 73b indicates the hysteresis range having respective hysteresis value widths 74a, 74b (hereinafter to be referred to as hysteresis width) above and below steering angle hysteresis processing value 72 at the center. Similarly, the region between broken lines 73c and 73d indicates the hysteresis range having respective hysteresis widths 74c, 74d above and below steering angle hysteresis processing value 72. Similarly, the portion between broken lines 73e and 73f indicates the hysteresis range having respective hysteresis widths 74e, 74f above and below steering angle hysteresis processing value 72.

The hysteresis value of hysteresis widths 74a, 74b is K2a, and the hysteresis value of hysteresis widths 74c, 74d is K2b. In addition, the hysteresis values comprise the right hysteresis value in the right direction with respect to the running direction of the vehicle and the left hysteresis value in the left direction with respect to the running direction of the vehicle. When not specified otherwise, the "left/right directions" will be omitted in the following from description of the hysteresis values, and they will simply be referred to as "hysteresis value."

Graph (b) of FIG. 11 shows absolute value 101 of the steering angular velocity of the steering wheel. Graph (c) shows swivel angle 75 of swiveling lamps 17a, 17b. In the graphs, time t0 is the time at which the vehicle speed, which has been constant, starts to increase, and the vehicle speed keeps increasing until time t1. After time t1, the vehicle speed becomes constant. Time t1 is the time at which absolute value 101 of the steering angular velocity of the steering wheel exceeds J1, and time t2 is the time when actual steering angle 71 departs from the hysteresis range defined by lines 73c, 73d. Time t3 is the time at which actual steering angle 71 of the steering wheel that has departed from the hysteresis range defined by lines 73c, 73d returns back into the hysteresis range defined by lines 73e, 73f, that is, when it starts decreasing.

Up to time t2, actual steering angle 71 of the steering wheel varies within the hysteresis range defined by lines 73a, 73b. In this case, even when actual steering angle 71 varies, steering angle hysteresis processing value 72 is constant. As a result, swivel angle 75 is also constant.

Figure 14:
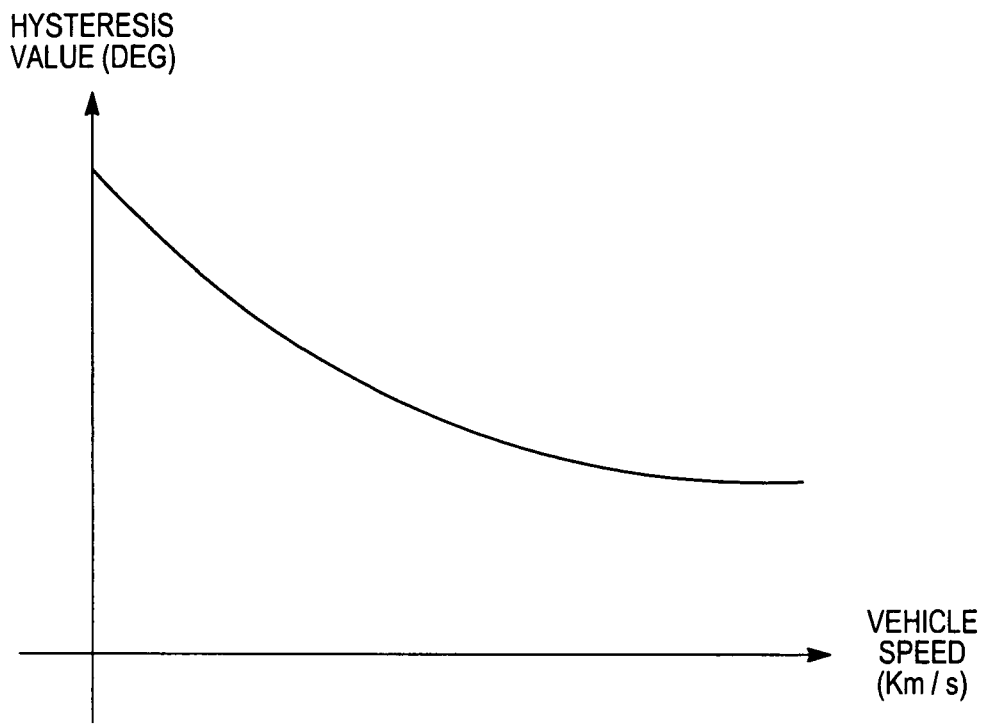
FIG. 14 is a graph illustrating the relationship between the vehicle speed and the hysteresis value (defined value K2) in accordance with the first application example.

During the period from time t0 to time t1, as time t1 approaches, vehicle speed increases. Consequently, as shown in FIG. 14, the hysteresis value decreases in conjunction with this trend, hysteresis widths 74a, 74b become smaller, and the hysteresis range defined by lines 73a, 73b becomes narrower.

Figure 10:
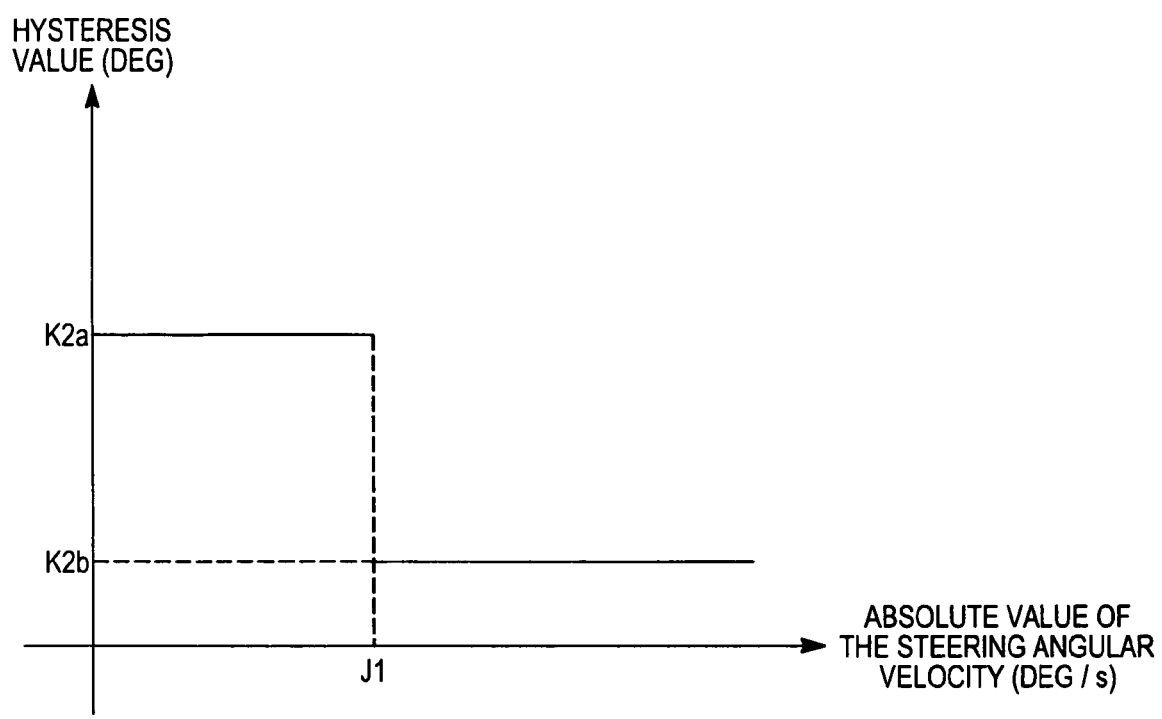
FIG. 10 is a graph illustrating another relationship between the absolute value of the steering angular velocity and the hysteresis value (defined value K2) in accordance with the first application example.

Returning now to FIG. 11, at time t1 absolute value 101 of the steering angular velocity of the steering wheel exceeds J1. Consequently, as shown in FIG. 10, the hysteresis value falls from K2a to K2b, and the hysteresis range narrows from the hysteresis range defined by lines 73a, 73b to the hysteresis range defined by lines 73c, 73d. That is, when the absolute value of the steering angular velocity of the steering wheel exceeds a prescribed value, the hysteresis value becomes smaller. Also, the value of K2 varies depending on the vehicle speed, as shown in FIG. 14. In the following, the value of K2 will be referred to as the defined value.

Returning again to FIG. 11, at time t2, as actual steering angle 71 increases it departs from the hysteresis range defined by lines 73c, 73d. In this case, steering angle hysteresis processing value 72 starts increasing, and swivel angle 75 starts increasing. During the period between times t2 and t3, steering angle hysteresis processing value 72 also increases corresponding to actual steering angle 71. As a result, swivel angle 75 increases together with actual steering angle 71.

At time t3, the increase in actual steering angle 71 stops. The increase in steering angle hysteresis processing value 72 also stops. As a result, the increase in swivel angle 75 also stops. After time t3, actual steering angle 71 of the steering wheel varies within the hysteresis range defined by lines 73e, 73f. In this case, even when actual steering angle 71 varies, steering angle hysteresis processing value 72 is still constant. As a result, swivel angle 75 is also constant.

Figure 16:
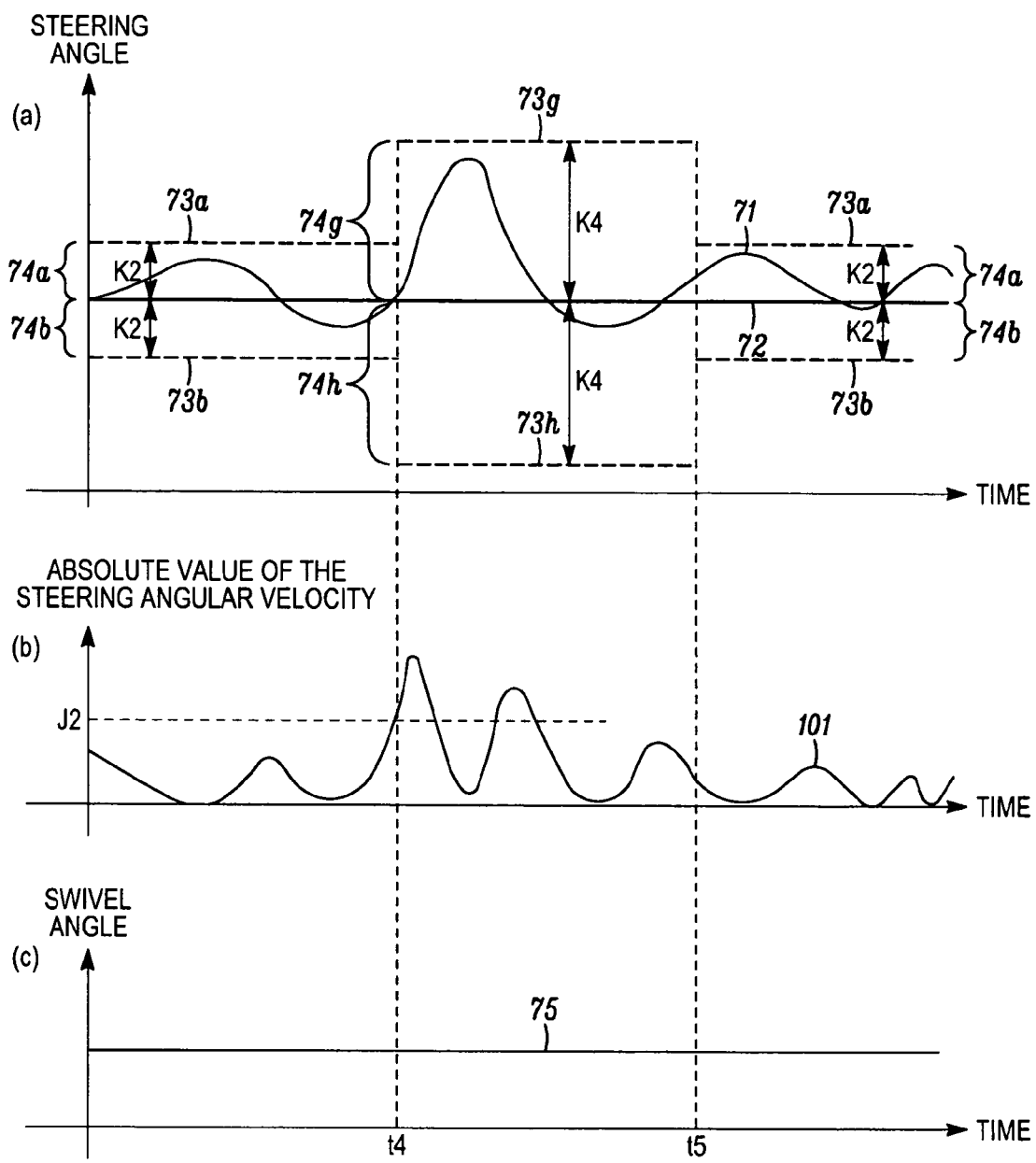
FIG. 16 includes graphs illustrating the swivel angle control of the swiveling lamp at the hysteresis value shown in FIG. 15.

As shown in FIG. 16, when the vehicle runs on a straight substandard road, such as a rutted road, the driver performs very quick steering operations (turning the steering wheel) in order to maintain the running direction of the vehicle. Graph (a) illustrates the steering angle and steering angle hysteresis processing value for the steering wheel. Line 71 indicates the actual steering angle of the steering wheel, and line 72 indicates the steering angle hysteresis processing value. Up to time t4, hysteresis widths 74a, 74b are the defined value K2, hysteresis widths 74g, 74h are value K4 between times t4-t5, and hysteresis widths 74a, 74b are defined value K2 after time t5. Consequently, at time t4, the hysteresis range widens from the hysteresis range defined by lines 73a, 73b to the hysteresis range defined by lines 73g, 73h. At time t5, the hysteresis range narrows from the hysteresis range defined by lines 73g, 73h to the hysteresis range defined by lines 73a, 73b.

Graph (b) illustrates absolute value 101 of the steering angular velocity of the steering wheel. Graph (c) illustrates swivel angle 75 of swiveling lamps 17a, 17b. At time t4, when the wheels are caught in ruts, the driver performs swift steering wheel operations in order to maintain the running direction. As a result, the absolute value of the steering angular velocity of the steering wheel exceeds J2 at this time. Time t5 occurs when a prescribed time has elapsed since the absolute value of the steering angular velocity of the steering wheel exceeded J2.

Up to time t4, actual steering angle 71 of the steering wheel lies within the hysteresis range defined by lines 73a, 73b. As a result, even when actual steering angle 71 varies, steering angle hysteresis processing value 72 remains constant. Consequently, swivel angle 75 is also constant up to time t4. At time t4, absolute value 101 of the steering angular velocity of the steering wheel exceeds prescribed value J2. Consequently, the hysteresis range widens from the hysteresis range defined by lines 73a, 73b to the hysteresis range defined by lines 73g, 73h. (See FIG. 15).

In the period between times t4 and t5, actual steering angle 71 becomes very large, but the hysteresis range is wider. Consequently, actual steering angle 71 still remains within the hysteresis range defined by lines 73g, 73h. As a result, even when actual steering angle 71 varies, steering angle hysteresis processing value 72 is constant. Consequently, during the period between times t4 and t5 swivel angle 75 is also constant. After time t5, the hysteresis range narrows from the hysteresis range defined by lines 73g, 73h to the hysteresis range defined by lines 73a, 73b, but actual steering angle 71 lies within the hysteresis range defined by lines 73a, 73b. Consequently, steering angle hysteresis processing value 72 is constant. As a result, after time t5 swivel angle 75 also becomes constant.

Also, just as with defined value K2, hysteresis value K4 during running on a substandard road is a value that can be adjusted to correspond to the vehicle speed and steering angular velocity.

Figure 24:
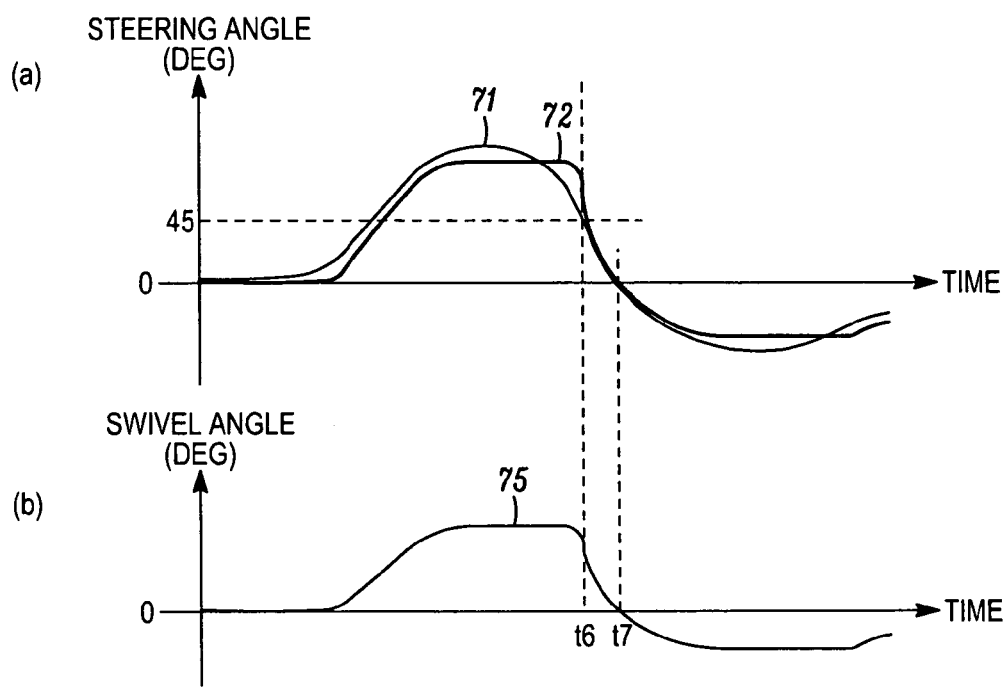
FIG. 24 includes graphs illustrating the swivel angle control of the swiveling lamp in the vehicle headlamp device in accordance with the first application example for computing hysteresis value C.

As shown in FIG. 24, the vehicle enters a road with an S-shaped curve or other shape of curve, and it is assumed that the vehicle is passing from a rightward curve to a leftward curve. Also, the steering angle of the vehicle in the straight running direction and the swivel angle of swiveling lamps 17a, 17b are 0°, the steering angle and swivel angle in the right direction with respect to the straight running direction are assumed to be positive, and the steering angle and swivel angle in the left direction are assumed to be negative.

Graph (a) in FIG. 24 shows the steering angle and steering angle hysteresis processing value for the steering wheel. Line 71 shows the actual steering angle of the steering wheel, and line 72 shows the steering angle hysteresis processing value. At time t6, actual steering angle 71 is decreased at a steering angular velocity greater than 180°/sec, while the steering angle passes through 45°. At time t7, actual steering angle 71 passes through 0°. Graph (b) shows swivel angle 75 of swiveling lamps 17a, 17b.

Up to time t6, steering angle hysteresis processing value 72 varies based on the prescribed hysteresis value (such as defined value K2). At time t6, the hysteresis value is switched to a small value K5. In conjunction with this switch, steering angle hysteresis processing value 72 is also switched to a smaller value and becomes similar to actual steering angle 71. At time t7 when actual steering angle 71 becomes 0°, there is no significant delay, and steering angle hysteresis processing value 72 passes through 0°. Also, swivel angle 75 passes through 0° without significant delay at time t7. Then, without significant delay in actual steering angle 71, steering angle hysteresis processing value 72 becomes negative, and swivel angle 75 also becomes negative without significant delay in actual steering angle 71.

Also, just as with defined value K2, hysteresis value K5 also can be changed to correspond to the vehicle speed and the steering angular velocity.

Figure 28:
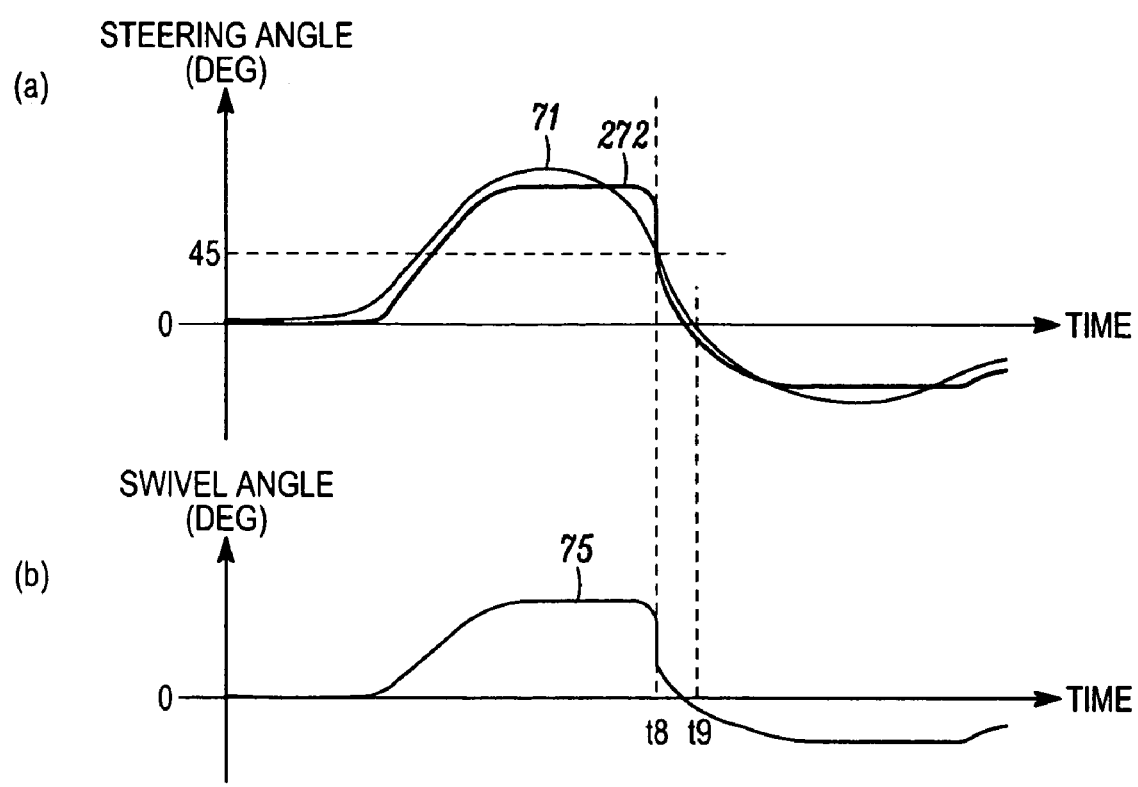
FIG. 28 includes graphs illustrating the offset processing of the swivel angle control of the swiveling lamp in the vehicle headlamp device in accordance with the first application example.

As shown in FIG. 28, the vehicle enters a road with continuous S-shaped curve or other shape of curve, and it is assumed that the vehicle enters a leftward curve from a rightward curve. Also, the steering angle of the vehicle in the straight running direction and the swivel angle of swiveling lamps 17a, 17b are 0°, the steering angle and swivel angle in the right direction with respect to the straight running direction are assumed to be positive, and the steering angle and swivel angle in the left direction are assumed to be negative.

Graph (a) in FIG. 28 shows the steering angle and steering angle offset processing value of the steering wheel. Line 71 shows the actual steering angle of the steering wheel, and line 272 shows the steering angle offset processing value. Here, the steering angle offset processing value is the value obtained by subtracting the offset value from the hysteresis processing value. Details of the offset value description will be described hereinafter. At time t8, actual steering angle 71 is decreased at a steering angular velocity greater than 180°/sec, while the steering angle passes through 45°. At time t9, actual steering angle 71 passes through 0°. Graph (b) shows swivel angle 75 of swiveling lamps 17a, 17b. Swivel angle 75 varies according to steering angle offset processing value 272.

Up to time t8, the offset value is 0°, and steering angle offset processing value 272 has the same value as the steering angle hysteresis processing value. At time t8 the offset value is switched to a larger value, and steering angle offset processing value 272 becomes smaller and becomes similar to the value of actual steering angle 71. At time t9 when actual steering angle 71 becomes 0°, steering angle offset processing value 272 passes through 0° C. without a significant delay. Also at time t9, swivel angle 75 passes through 0° without significant delay. Then, without significant delay in actual steering angle 71, steering angle offset processing value 272 becomes negative. Again without significant delay in actual steering angle 71, swivel angle 75 also becomes negative.

Figure 17:
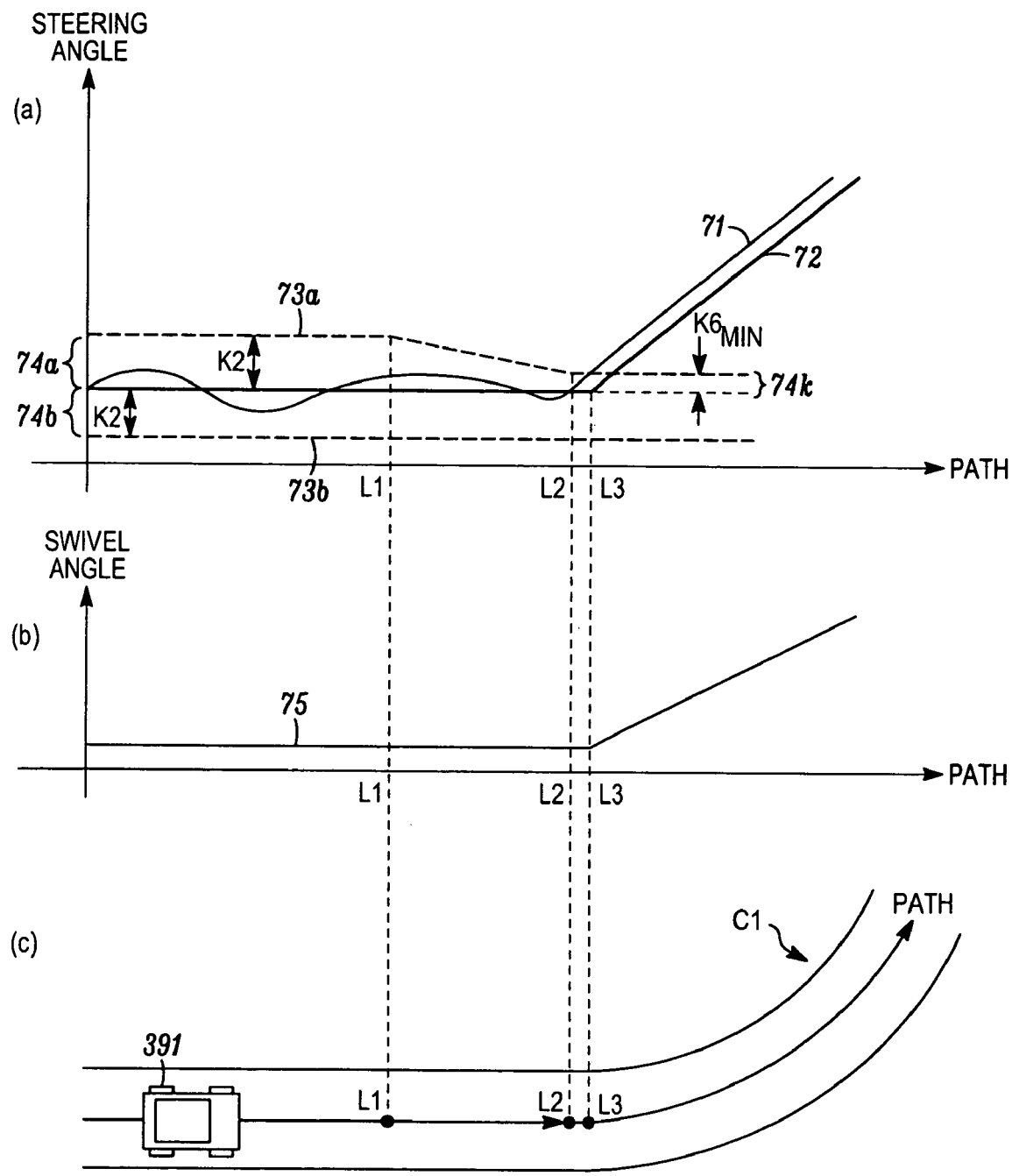
FIG. 17 includes graphs illustrating the swivel angle control of the swiveling lamp in the vehicle headlamp device in accordance with the first application example for computing hysteresis value A.

As shown in FIG. 17, when there is information about the presence/absence of an upcoming curve provided by the navigation unit, that is, when a signal about the presence/absence of a corner is input from navigation system 21 to road ahead judgment part 22, the vehicle enters a leftward curve while running.

Graph (a) illustrates the steering angle and steering angle hysteresis processing value of the steering wheel. Line 71 shows the actual steering angle of the steering wheel, and line 72 shows the steering angle hysteresis processing value. The hysteresis value of hysteresis widths 74a, 74b is the defined value K2, and the hysteresis value of hysteresis width 74k is the table look-up value (K6 minimum).

Schematic diagram (c) illustrates the state when vehicle 391 enters curve C1 bending to the left. Location L2 represents the entry location of curve C1, that is, the location of where the road starts to curve with a radius of curvature of 200 m or smaller. Location L1 is a location a prescribed distance prior to the location L2.

As shown in graph (a), before vehicle 391 moves to location L1, hysteresis widths 74a, 74b have defined value (K2). However, as the vehicle passes location L1 and approaches location L2, hysteresis width 74a on the left side, as the direction of the corner, gradually narrows in place of table look-up value (K6). Then, when the vehicle 391 reaches location L2 hysteresis width 74k reaches the table look-up value (K6 minimum).

In the following, the swivel angle of swiveling lamps 17a, 17b is explained with reference to graph (b). Ahead of location L1, because actual steering angle 71 of the steering wheel is within the hysteresis range defined by lines 73a, 73b, even when actual steering angle 71 varies, steering angle hysteresis processing value 72 remains constant. Consequently, swivel angle 75 is also constant up to location L1. In the region between location L1 and location L2, left-side hysteresis width 74a gradually becomes narrower (table look-up value K6). However, because actual steering angle 71 of the steering wheel is within the hysteresis range defined by lines 73a, 73b, steering angle hysteresis processing value 72 remains constant. In the region between location L2 and location L3, the hysteresis value of hysteresis width 74k on the left side is the table look-up value K6, the minimum value. However, actual steering angle 71 is within the hysteresis range defined by lines 73k, 73b, so that steering angle hysteresis processing value 72 becomes constant.

After passing location L3, because actual steering angle 71 increases and departs from the hysteresis range defined by lines 73k, 73b, steering angle hysteresis processing value 72 starts increasing. Consequently, swivel angle 75 starts increasing at location L3. That is, after location L3, steering angle hysteresis processing value 72 increases together with actual steering angle 71, and swivel angle 75 also increases together with actual steering angle 71.

Figure 21:
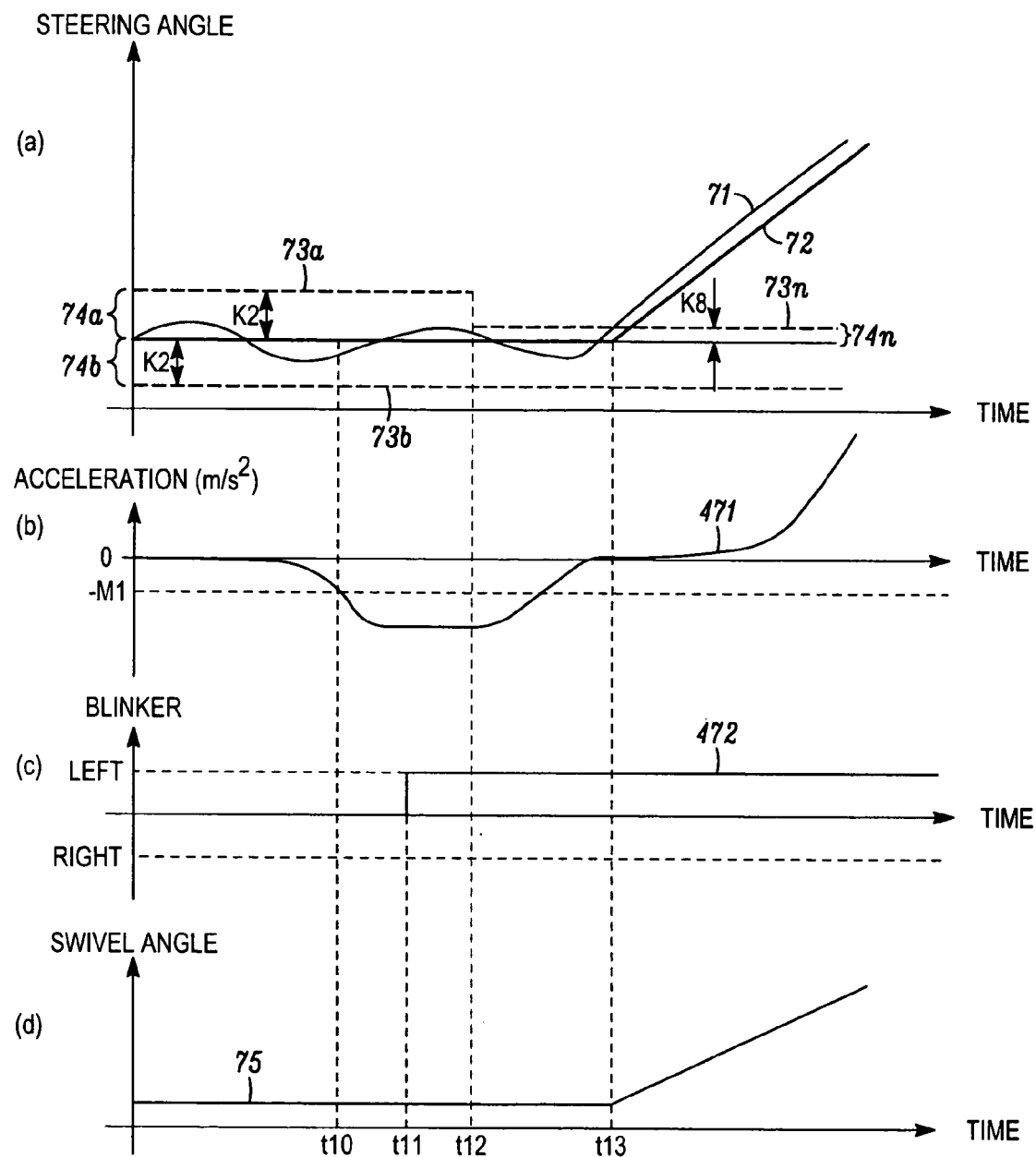
FIG. 21 includes graphs illustrating the swivel angle control of the swiveling lamp in the vehicle headlamp device in accordance with the first application example for computing hysteresis value B.

As shown in FIG. 21, when there is no information about the presence/absence of a curve from the navigation unit, that is, when there is no input of a signal pertaining to the presence/absence of a curve from navigation system 21 to road ahead judgment part 22, the blinker is ON, and the car turns left.

Graph (a) of FIG. 21 illustrates the steering angle and steering angle hysteresis processing value of the steering wheel. Line 71 shows the actual steering angle of the steering wheel, and line 72 shows the steering angle hysteresis processing value. The hysteresis value of hysteresis widths 74a, 74b is the defined value K2, and the hysteresis value of hysteresis width 74n is K8 (also called defined value 2).

Graph (b) shows the acceleration of the vehicle. The negative value of acceleration 471 indicates deceleration. The acceleration value −M, that is, value M of deceleration, becomes the judgment standard for switching the left hysteresis value from defined value K2 to defined value 2 (K8). Because the vehicle decelerates as the vehicle turns right/left, the vehicle deceleration becomes a parameter in judgment of the right/left curve ahead of the vehicle position. Here, it is assumed that at time t10 the deceleration of the vehicle exceeds −M1. Then it is assumed that the state with deceleration exceeding −M1 lasts beyond time t12 that is a prescribed time after time t10. Defined value 2 (K8) is a hysteresis value smaller than defined value (K2).

Graph (c) shows ON/OFF of the blinker light. When right/left turns are performed at an intersection, the blinker is turned ON. Consequently, the blinker being ON can be used as a factor in judging the approach of a corner. When ON/OFF line 472 from blinker light lies on the central line, the blinker is not turned ON. When ON/OFF line 472 is above the central line, the left-side blinker is turned ON. Conversely, when ON/OFF line 472 is below the central line, the right-side blinker is turned ON. In this example, it is assumed that left-side blinker is turned ON at time t11 between times t10 and t12.

As shown in graph (a) of FIG. 21, the hysteresis value of hysteresis widths 74a, 74b up to time t12 is defined value (K2). At time t11, however, the left-side blinker is turned ON, so that when time t12 is reached, the left hysteresis value of hysteresis width 74n is set at defined value 2 (K8).

In the following, the swivel angle of swiveling lamps 17a, 17b is explained with reference to graph (d). Up to time t12, actual steering angle 71 of the steering wheel is within the hysteresis range defined by lines 73a, 73b. Consequently, even when actual steering angle 71 varies, steering angle hysteresis processing value 72 remains constant. As a result, up to time t12 swivel angle 75 is also constant. At time t12, hysteresis width 74n becomes smaller. However, because actual steering angle 71 of the steering wheel lies within the hysteresis range defined by lines 73n, 73b, steering angle hysteresis processing value 72 remains constant. At time t13, because actual steering angle 71 increases and departs from the hysteresis range defined by 73n, 73b, steering angle hysteresis processing value 72 starts to increase. Consequently, at time t13 swivel angle 75 starts to increase. That is, after time t13 steering angle hysteresis processing value 72 increases together with actual steering angle 71, and swivel angle 75 also increases with the actual steering angle 71.

Figure 8:
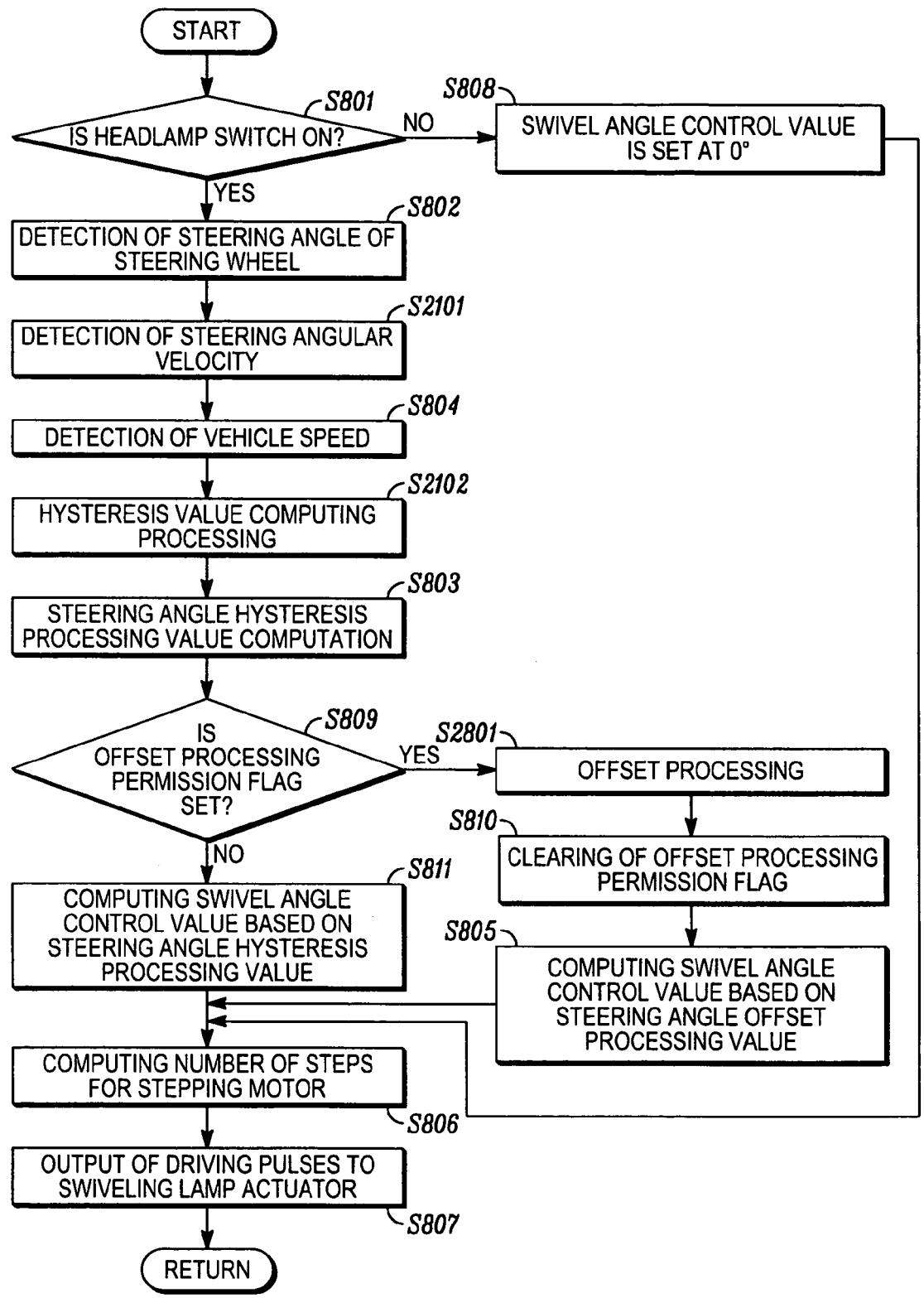
FIG. 8 is a flow chart illustrating swivel angle control of the swiveling lamp in the vehicle headlamp device in accordance with the first application example.

In the following, the swivel angle control processing for swiveling lamps 17a, 17b in vehicle headlamp device 1 in an embodiment of the invention will be explained with reference to the flow chart shown in FIG. 8. The processing shown in FIG. 8 is executed in swivel control ECU 11 by means of a program that is started when ignition switch 12 is turned ON. Here, the initial steering angle hysteresis processing value is set at 0°, and the swivel angle for the vehicle straight running direction is set at 0°.

In step S801, a judgment is made as to whether headlamp switch 13 is ON. If headlamp switch 13 is ON, process flow advances to step S802. On the other hand, when headlamp switch 13 is OFF in step S801, process flow advances to step S808. In step S802 the steering angle of the steering wheel is detected by means of the steering angle signal from steering angle sensor 15, and process flow advances to step S2101.

In step S2101 the steering angular velocity is computed from the displacement distance of the steering angle detected by steering angle sensor 15. In the next step, step S804, the vehicle speed is detected from the vehicle speed signal from vehicle speed sensor 14. According to the next step S2102, the hysteresis value computing processing is performed, and the hysteresis value is computed. Details of the processing for computing the hysteresis value are explained hereinafter. Process flow then advances to step S803 where the steering angle hysteresis processing value is computed by means of the steering angle hysteresis processing value computation. Computation of the steering angle hysteresis processing value is also explained hereinafter.

The query in step S809 judges whether or not the offset processing permission flag is set. If the offset processing permission flag is set, process flow proceeds to step S2801. On the other hand, when the offset processing permission flag is not set, process flow proceeds to step S811.

In step S2801, the steering angle offset processing value is computed, and process flow advances to step S810. Computation of the offset value is described hereinafter. At step S810 the offset processing permission flag is cleared, and process flow advances to step S805. In step S805, based on the steering angle offset processing value and the vehicle speed, the swivel angle control value is computed. Then, process flow advances to step S806.

Alternatively, in step S811, based on the steering angle hysteresis processing value and the vehicle speed, the swivel angle control value is computed. Process flow then advances to step S806.

When the headlamp switch is not on, as indicated by the response to the query in step S801, process flow advanced to step S808. In step S808 the swivel angle control value is set at 0°, and process flow also proceeds to step S806.

In step S806 the number of steps of stepping motor 161 is computed for driving swiveling lamps 17a, 17b to the computed swivel angle control value. Next, the driving pulses are generated based on the computed number of steps, and these are output to swiveling lamp actuators 16a, 16b in step S807.

In the following, the hysteresis value computing processing in step S2102 is explained with reference to FIG. 7.

In step S701, a judgment is made as to whether the vehicle is running on a substandard road by road surface state detecting part 116. If the vehicle is running on a substandard road, process flow advances to step S713. On the other hand, if the vehicle is not running on a substandard road, process flow advances to step S702.

Figure 15:
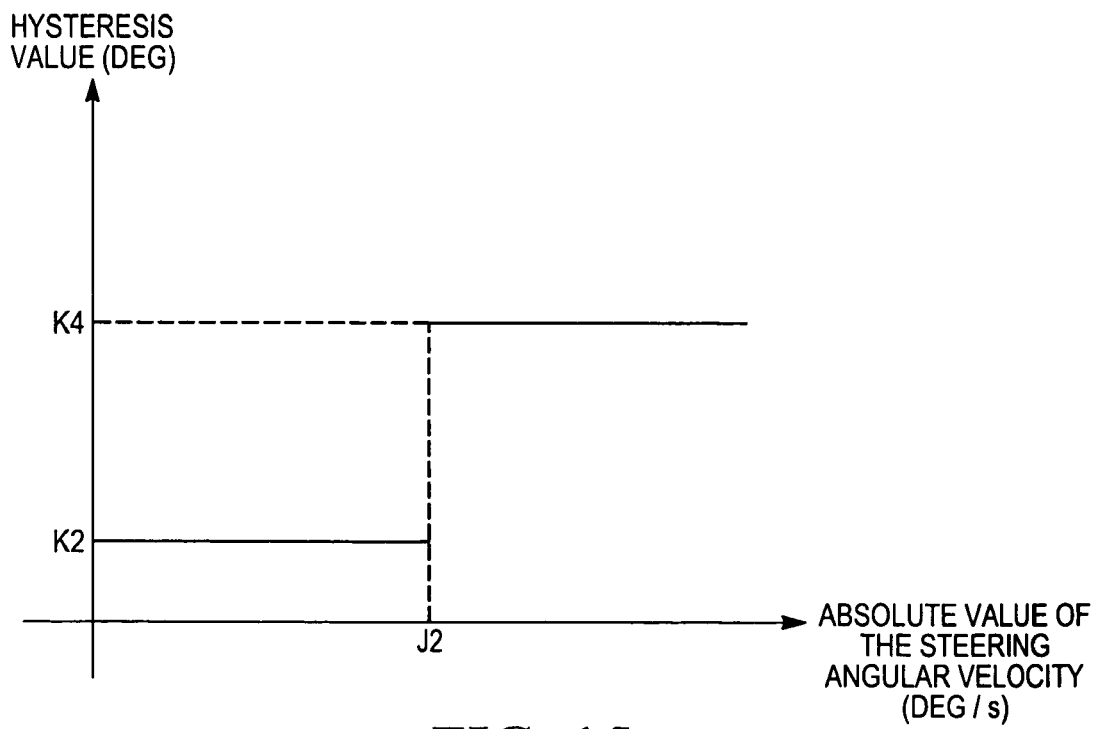
FIG. 15 is a graph illustrating the relationship between the absolute value of steering angular velocity and the hysteresis value when the vehicle runs on a substandard road in accordance with the first application example.

The query of step S713 judges whether or not the absolute value of the steering angular velocity is smaller than the value J2 shown in FIG. 15. If the value is smaller than J2, a positive judgment is made in step S713, and process flow proceeds to step S702. If the value is larger than J2, a negative judgment is made in step S713, and process flow proceeds to step S714. Step S714 corresponds to the conditions in FIG. 16, and the left hysteresis value and the right hysteresis value are set at the value K4 as shown in FIG. 15.

Here, the value K4 is double or more of that of the defined value (K2). The hysteresis value computing processing then ends.

In the query of step S702 whether the vehicle is running straight ahead is judged using the steering angle and yaw rate. When the vehicle runs straight ahead, a positive judgment is made in step S702, and process flow advances to step S703. When the vehicle follows a curve, a negative judgment is made in step S702, and process flow advances to step S710. The query in step S710 judges whether or not the absolute value of the steering angular velocity is larger than a prescribed value. If it is larger than the prescribed value, process flow advances to step S711 where the offset permission flag is set prior to process flow advancing to step S712. On the other hand, if the absolute value of the steering angular velocity is smaller than the prescribed value, process flow advances directly to step S712.

Step S712 corresponds to the conditions in FIG. 24. In this step, based on the "hysteresis computing C" flow chart to be explained later, the hysteresis value is computed. Then, the processing of step S2102 in FIG. 8 comes to an end.

Returning now to FIG. 7, the query in step S703 judges whether or not the information of the presence/absence of a corner has been sent from navigation system 21 to swivel control ECU 11. When the information regarding the presence/absence of a corner has been transmitted, a positive response is made to the query in step S703. Then, process flow advances to step S704. On the other hand, when the information has not been transmitted, a negative response is made to the query in step S703. Then, process flow advances to step S705. Step 704 corresponds to the conditions in FIG. 17. In this step, based on the "hysteresis computing A" flow chart to be explained hereinafter, the hysteresis value is computed. The processing of step S2102 in FIG. 8 comes to an end.

Returning now to FIG. 7, in step S705, based on a judgment as to whether the blinker is ON, detection of blinker ON by blinker detecting part 23 is made. If the blinker is ON, a positive judgment is indicated in step S705, and process flow goes to step S706. If the blinker is OFF, a negative judgment is indicated in step S705, and process flow goes to step S709. Step S706 corresponds to the conditions in FIG. 21. In this step the hysteresis value is computed based on the "hysteresis computing B" flow chart to be explained hereinafter. The processing of step S2102 in FIG. 8 then comes to an end.

In step S709 left/right hysteresis variation flag B is cleared, and process flow advances to step S708. Here, left/right hysteresis variation flag B is a flag that is set in steps S5105 and S5106 in hysteresis computing B of step S706, to be explained hereinafter. Step S708 corresponds to the conditions in FIG. 11, with the hysteresis value set as the defined value K2. The processing of step S2102 in FIG. 8 comes to an end.

In the following, hysteresis computing A of step S704 of FIG. 7 will be explained with reference to FIGS. 18, 19 and 20.

Figure 18:
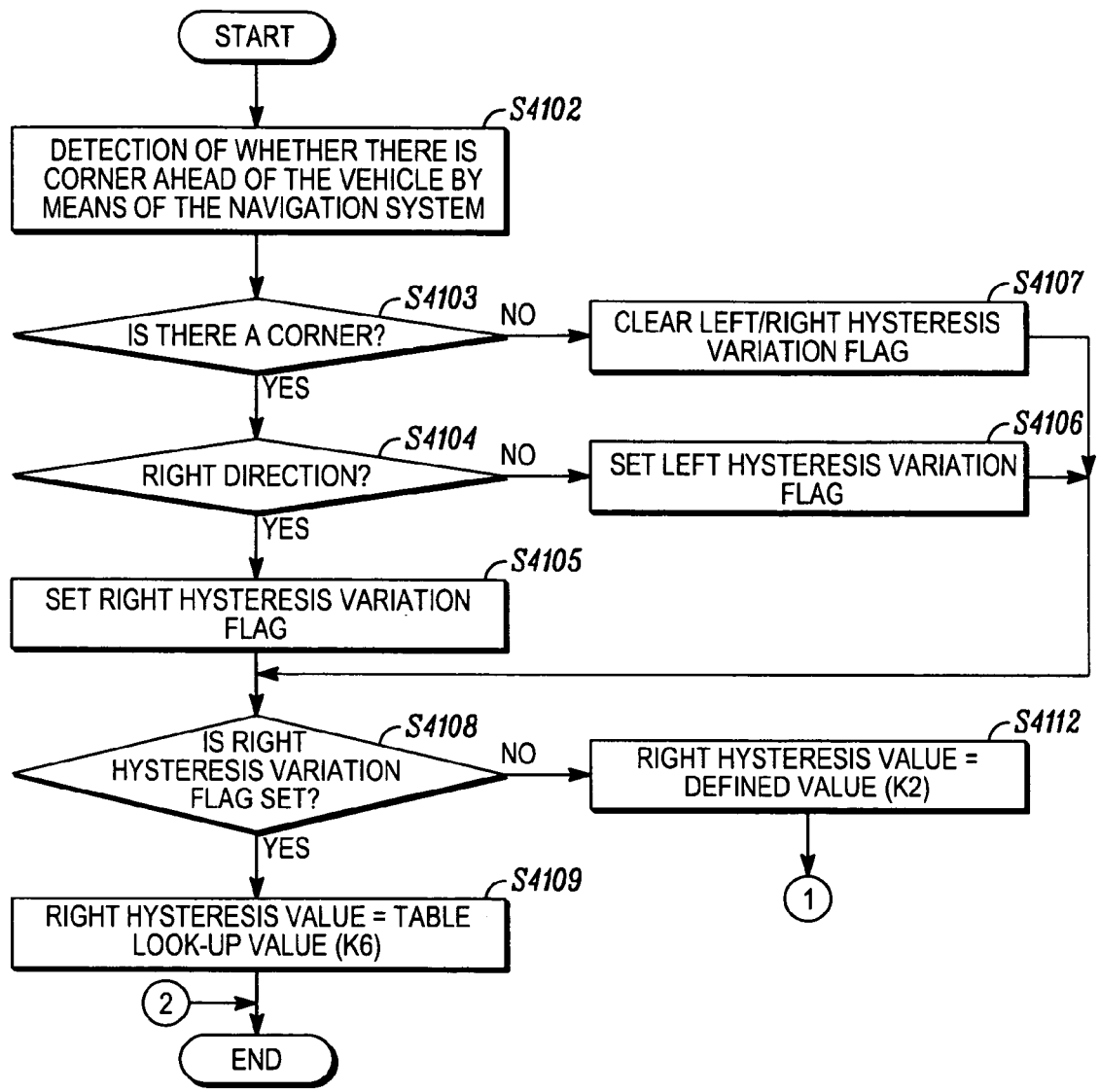
FIG. 18 is a flow chart illustrating the step of hysteresis computing A in FIG. 7.
Figure 19:
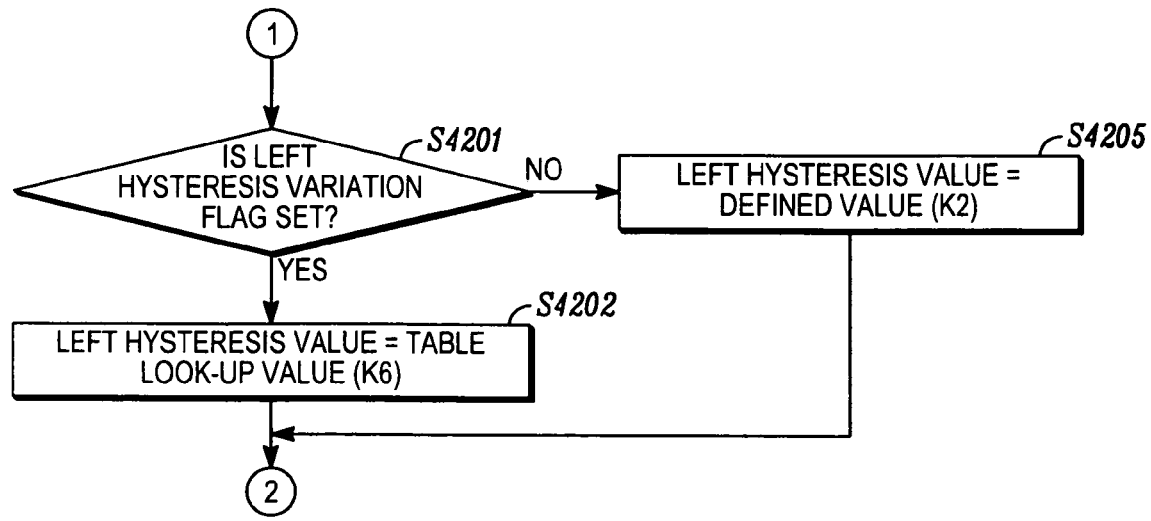
FIG. 19 is a flow chart illustrating the step of hysteresis computing A in FIG. 7.

Starting with FIG. 18, in step S4102 whether there is a curve in the vehicle running direction is detected from the present position of the vehicle and the road data relating to the vicinity of the vehicle detected by navigation system 21. The query of the next step, step S4103, judges whether or not there is a curve in the vehicle running direction. If there is, process flow proceeds to step S4104. If there is not, process flow proceeds to step S4107. In the query of step S4104, a judgment is made as to whether the curve veers right. If it veers right, process flow proceeds to step S4105 where the right hysteresis variation flag is set. Conversely, when the curve does not veer right, that is, when it veers left, process flow proceeds to step S4106 where the left hysteresis variation flag is set.

Here, the right hysteresis variation flag is a flag for judgment as to whether the hysteresis width in the rightward direction with respect to the vehicle running direction decreases. The left hysteresis variation flag is a flag for judgment as to whether the hysteresis width in the leftward direction with respect to the vehicle running direction decreases. In step S4107 the right hysteresis variation flag and left hysteresis variation flag are cleared.

The query in step S4108 judges whether or not the right hysteresis variation flag is set. If the flag is set, process flow advances to step S4109. In step S4109 the hysteresis value of the hysteresis width in the rightward direction with respect to the vehicle running direction (hereinafter to be referred to as the right hysteresis value) is set at the table look-up value (K6). The table look-up value (K6) is the hysteresis value computed from the prescribed relationship between the distance to the corner and the hysteresis value shown in FIG. 20. As shown in FIG. 20, as the distance to the corner becomes shorter, the hysteresis value becomes smaller. After step S4109, the hysteresis value computing processing then comes to an end.

In contrast, when this flag is not set as indicated by the response to the query in step S4108, process flow advances to step S4112 where the right hysteresis value is set at the defined value K2. Process flow then advances to step S4201 in FIG. 19.

In the query of step S4201, a judgment is made as to whether the left hysteresis variation flag is set. If this flag is set, a positive judgment is indicated in step S4201. Next, process flow advances to step S4202. In step S4202 the hysteresis value of the hysteresis width in the leftward direction with respect to the vehicle running direction (hereinafter to be referred to as the left hysteresis value) is set at the table look-up value (K6) shown in FIG. 20. When the left hysteresis variation flag is not set a negative judgment is indicated in step S4201, and process flow advances to step S4205 where the left hysteresis value is set at the defined value K2. Step S704 then comes to an end as shown in FIG. 18.

In the following, hysteresis computing B in step S706 is explained with reference to FIGS. 22 and 23.

Figure 22:
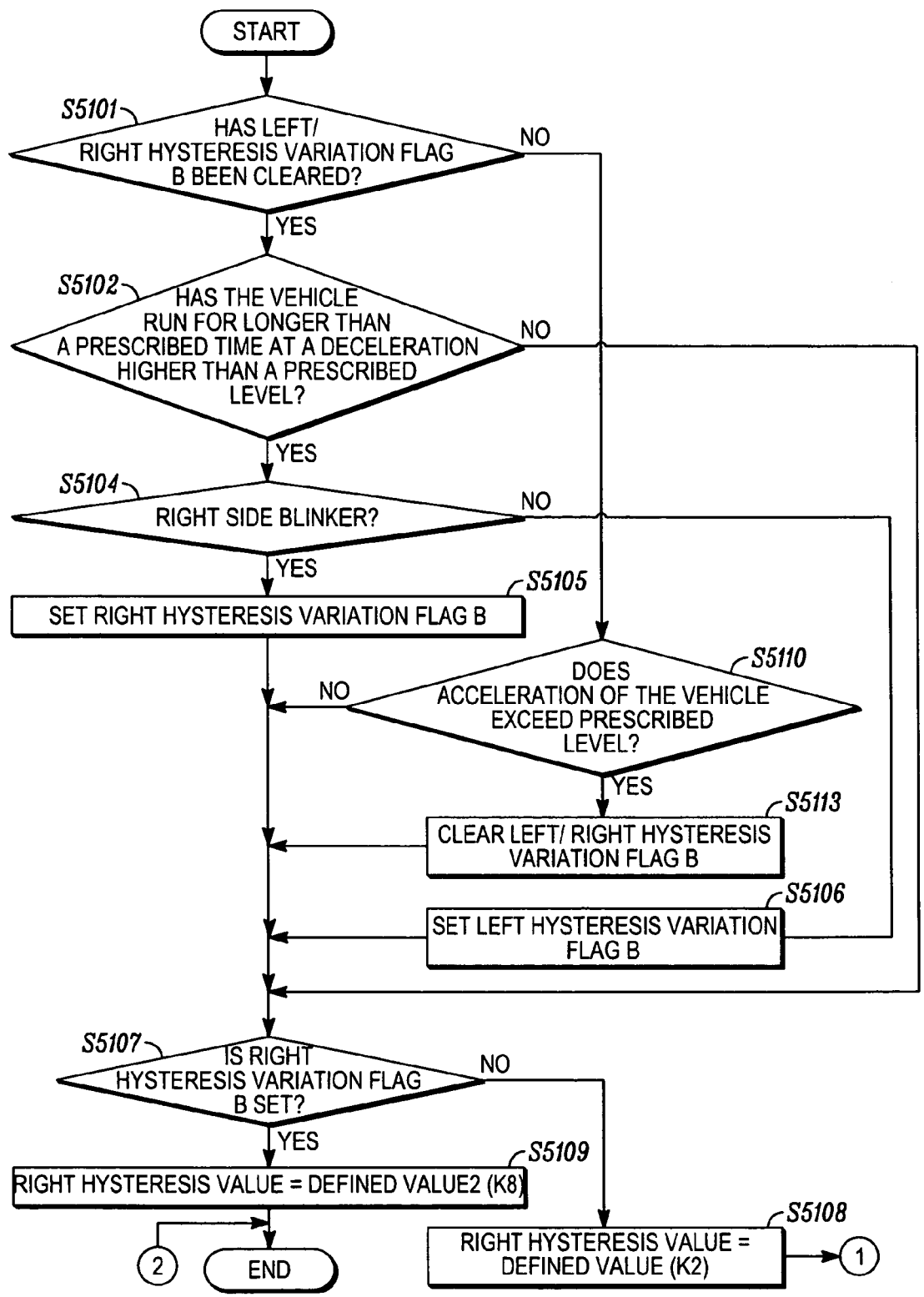
FIG. 22 is a flow chart illustrating the step of hysteresis computing B in FIG. 7.

Starting with FIG. 22, the query in step S5101 judges whether or not left hysteresis variation flag B and right hysteresis variation flag B have been cleared. If these flags have been cleared, process flow advances to step S5102. On the other hand, if they have not been cleared, that is, if left hysteresis variation flag B or right hysteresis variation flag B is set, process flow advances to step S5110.

The query in step S5110 judges whether or not the acceleration of the vehicle exceeds a prescribed value. If YES, that is, the acceleration exceeds the prescribed value, process flow goes to step S5113. If NO, that is, the acceleration does not exceed the prescribed value, process flow goes to step S5107.

Alternatively, in the query of step S5102 a judgment is made as to whether the condition that the vehicle has been running for longer than a prescribed time at a deceleration greater than a prescribed value is established from the vehicle speed detected by vehicle speed sensor 14. If this condition is established, process flow advances to step S5104. On the other hand, if this condition is not established, process flow advances to step S5107.

The query in step S5104 judges whether or not the blinker on is the blinker on the right-hand side. If the blinker is on the right-hand side, process flow goes to step S5105 where right hysteresis variation flag B is set. If the blinker is on the left-hand side, process flow goes to step S5106 where left hysteresis variation flag B is set. Here, right hysteresis variation flag B is a flag for judgment as to whether the hysteresis width in the rightward direction with respect to the vehicle running direction decreases, and left hysteresis variation flag B is a flag for judgment as to whether the hysteresis width in the leftward direction with respect to the vehicle running direction decreases. In step S5113, right hysteresis variation flag B and left hysteresis variation flag B are cleared.

After any of steps S5105, S5106 or S5113, process flow advances to step S5107, where a judgment is made as to whether right hysteresis variation flag B has been set. If it has been set, process flow goes to step S5109 where the right hysteresis value is set at defined value 2 (K8). The hysteresis value computing processing then ends. On the other hand, if the right hysteresis variation flag B has not been set, process flow goes to step S5108 where the right hysteresis value is set at the defined value (K2). Then, process flow goes to step S5201 shown in FIG. 23.

Figure 23:
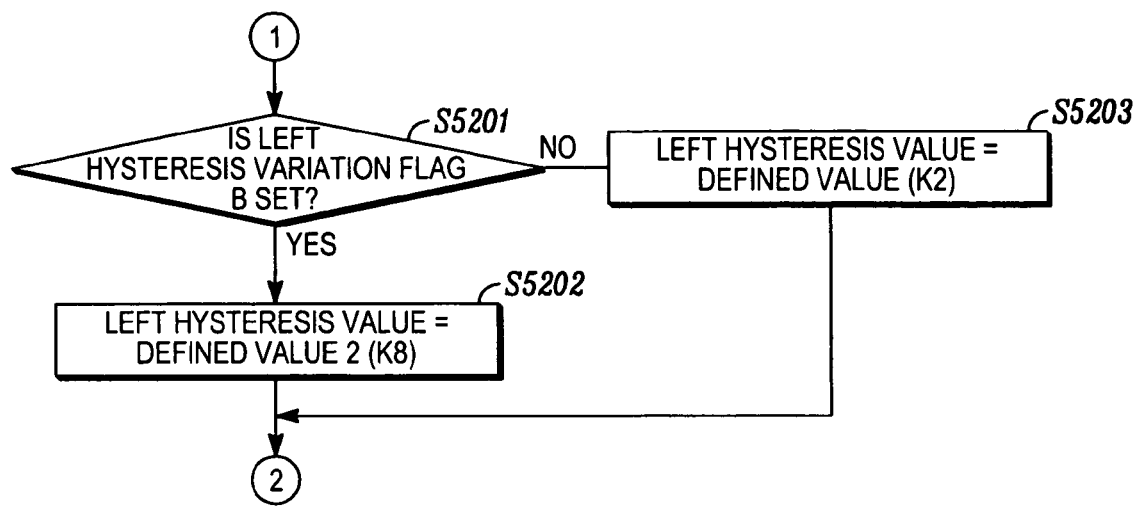
FIG. 23 is a flow chart illustrating the step of hysteresis computing B in FIG. 7.

The query in step S5201 shown in FIG. 23 judges whether or not the left hysteresis variation flag B has been set. If it has been set, process flow goes to step S5202 where the left hysteresis value is set at defined value 2 (K8). Conversely, when left hysteresis variation flag B has not been set, process flow goes to step S5203 where the left hysteresis value is set at defined value (K2). The hysteresis value computing processing then comes to an end as shown in FIG. 22.

Figure 7:
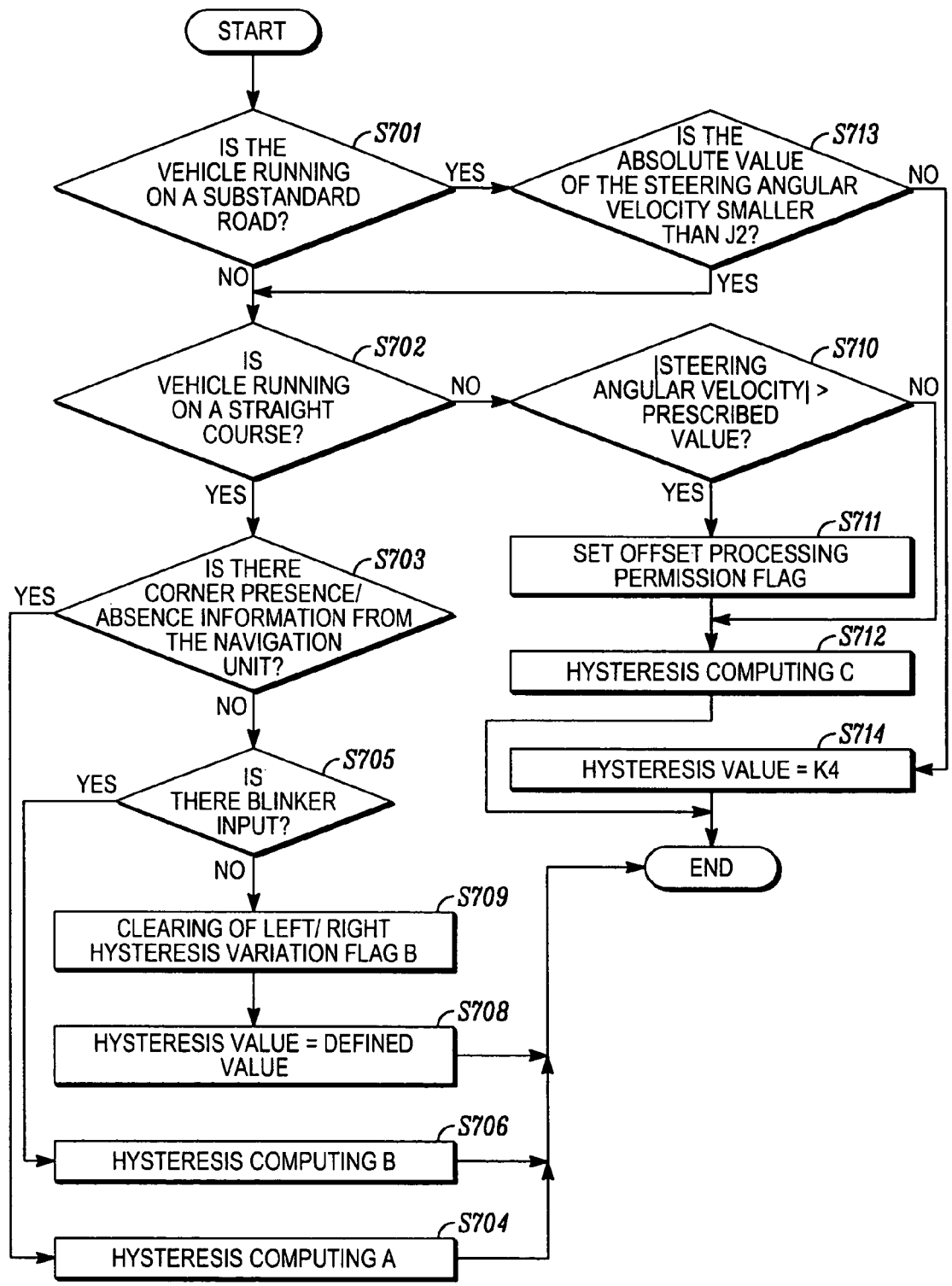
FIG. 7 is a flow chart illustrating the hysteresis value computing processing in the vehicle headlamp device in accordance with the first application example.

In the following, hysteresis computing C in step S712 of FIG. 7 is explained with reference to FIGS. 25, 26 and 27.

Figure 27:
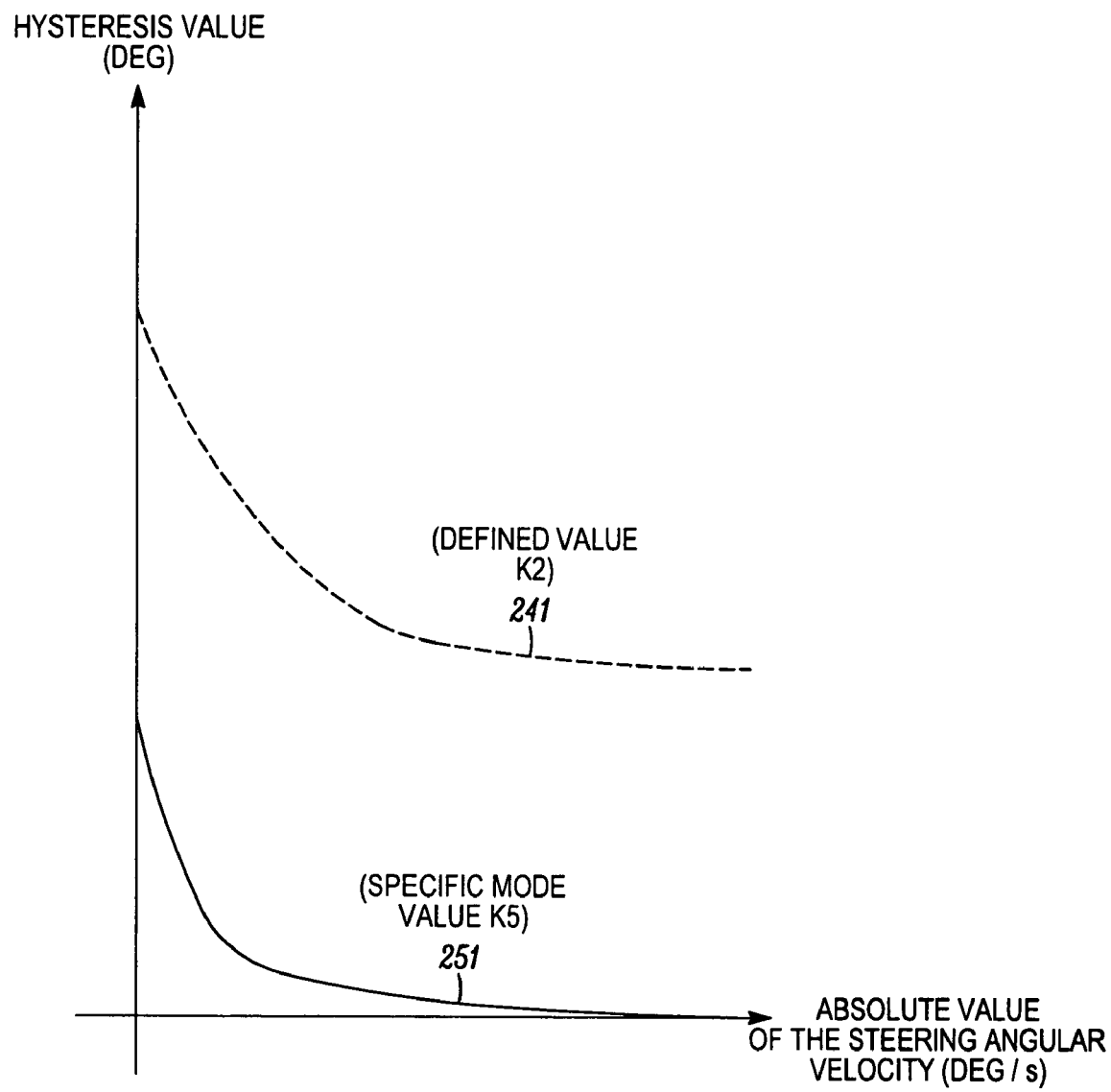
FIG. 27 is a graph illustrating the relationship between the absolute value of the steering angular velocity and the normal mode value of the hysteresis value C in accordance with the first application example.

Here, specific mode value K5 refers to the hysteresis value computed from the specific mode value curve 251 shown in FIG. 27 that illustrates the relationship between the hysteresis value and the absolute value of the steering angular velocity. As a control, curve 241 of defined value K2 is shown as a broken line in FIG. 27. The specific mode value K5 is smaller than the defined value K2 obtained at the same absolute value of the steering angular velocity.

Figure 25:
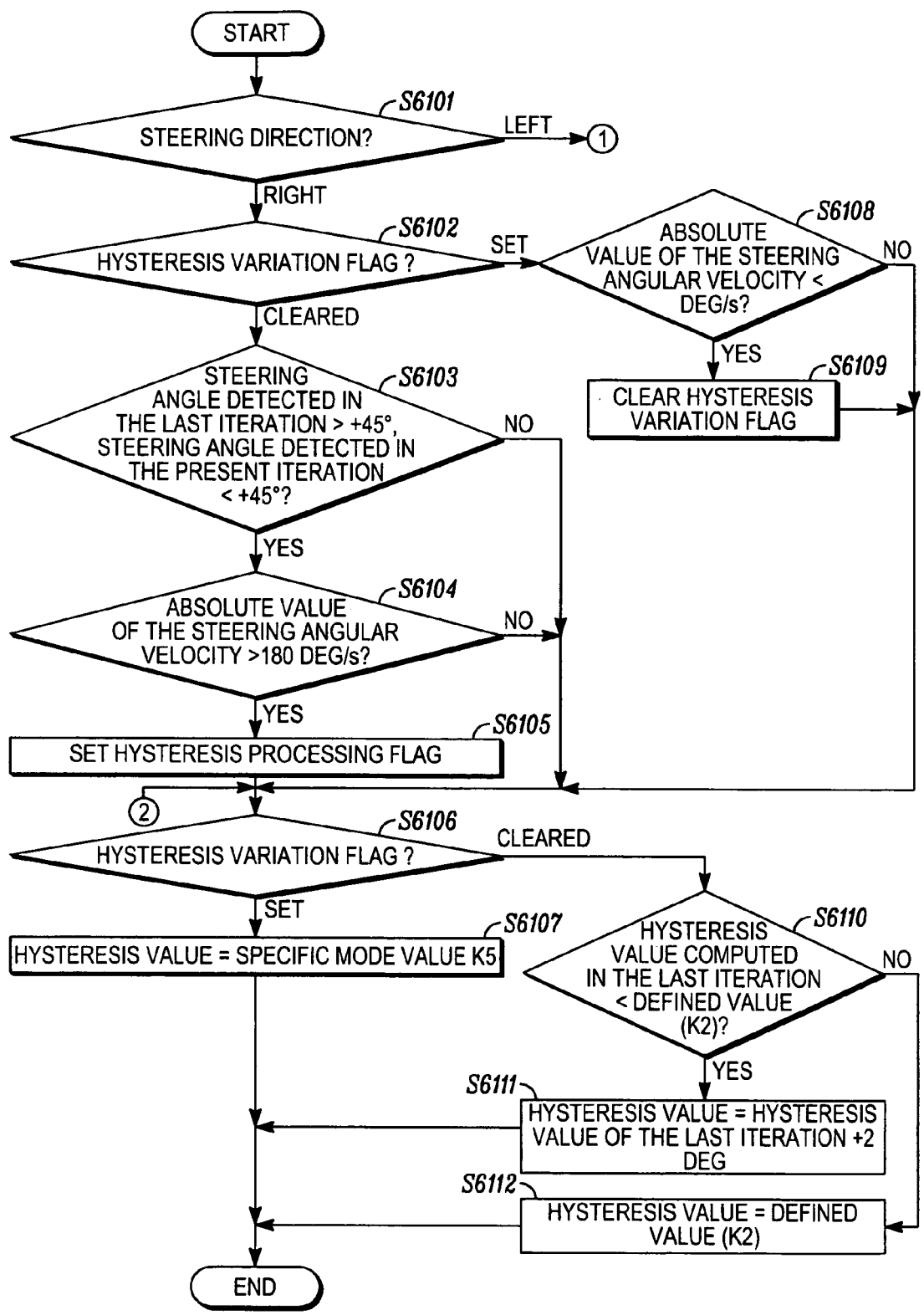
FIG. 25 is a flow chart illustrating the step of hysteresis computing C in FIG. 7.

Turning to FIG. 25, the query in step S6101 judges whether or not the steering direction is to the right or to the left. If the direction is to the right, process flow goes to step S6102. If the direction is to the left, process flow goes to step S6201 shown in FIG. 26, discussed hereinafter. Step S6102 is also a query, and it judges whether the hysteresis variation flag is cleared or set. Here, the hysteresis variation flag is used in judging whether the hysteresis value has been switched to the specific mode value. If the flag has been cleared, process flow advances to step S6103. If the flag has been set, process flow goes to step S6108, discussed hereinafter.

The query in step S6103 judges whether or not the steering angle detected in the last iteration is larger then 45° and the steering angle detected in the present iteration is smaller than 45°. If these conditions are both met, process flow advances to step S6104. If neither condition is met, process flow advances to step S6106. The query in step S6104 judges whether or not the absolute value of the steering angular velocity is larger than 180°/sec. If the absolute value is larger than 180°/sec, process flow advances to step S6105, where the hysteresis variation flag is set. Process flow then advances from step S6105 to step S6106.

If the absolute value is 180°/sec or less, process flow advances directly to step S6106.

Step S6108 also includes a query, which judges whether or not the absolute value of the steering angular velocity is smaller than 180°/sec. If the absolute value is smaller than 180°/sec, process flow goes to step S6109 where the hysteresis variation flag is cleared. Process flow then goes to step S6106. If the absolute value is 180°/sec or larger, process flow goes directly to step S6106.

Step S6106 is reached via any of steps S6103-S6105, S6108 or S6109, as described, or any of steps S6202-S6206 of FIG. 26, discussed hereinafter. The query in step S6106 judges whether the hysteresis variation flag has been set or cleared. If the flag has been set, process flow goes to step S6107 where the hysteresis value is set at specific mode value K5. Then, process flow ends. Alternatively, if the flag has been cleared, process flow goes to step S6110.

The query in step S6110 judges whether or not the hysteresis value computed in the last iteration is smaller than the defined value K2. If the hysteresis value is smaller than the defined value K2, process flow advances to step S6111 where the hysteresis value is set as the value obtained by adding 2° to the hysteresis value of the last iteration. If the hysteresis value is the defined value K2 or larger, process flow advances to step S6112 where the hysteresis value is set at defined value K2. In either case, process flow then ends.

Figure 26:
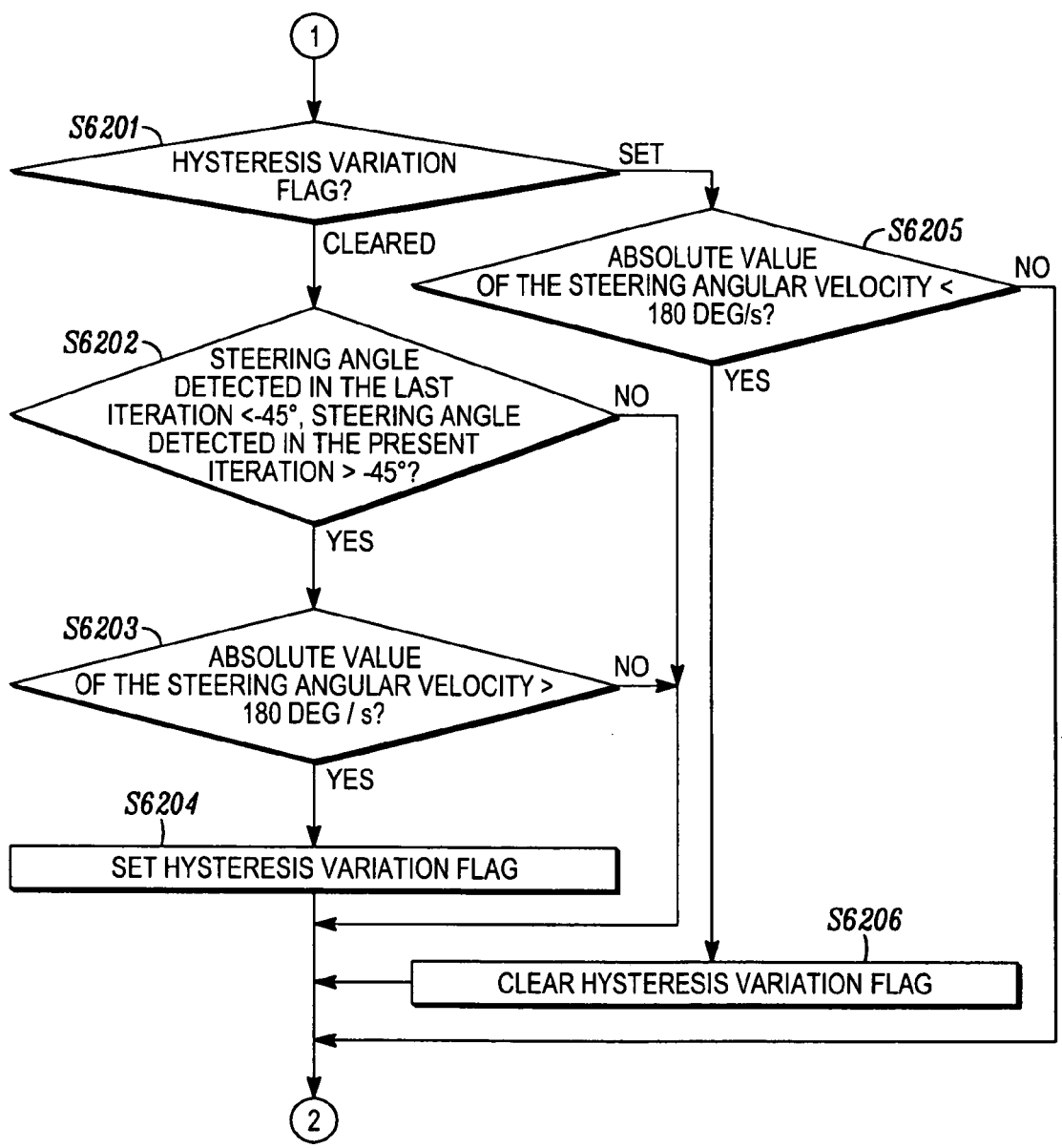
FIG. 26 is a flow chart illustrating the step of hysteresis computing C in FIG. 7.

If the steering direction is to the left in response to the query in step S6101, process flow advances to step S6201 shown in FIG. 26. This step judges whether the hysteresis variation flag has been set or cleared. If the flag has been cleared, process flow advances to step S6202. If the flag has been set, process flow advances to step S6205.

The query in step S6202 judges whether the steering angle detected in the last iteration is smaller than −45° and the steering angle detected in the present iteration is larger than −45°. If these conditions are met, process flow goes to step S6203. Otherwise, one of the conditions is not met, and process flow returns to step S6106 shown in FIG. 25.

Returning now to FIG. 26, the query in step S6203 judges whether or not the absolute value of the steering angular velocity is larger than 180°/sec. If it is larger than 180°/sec, process flow goes to step S6204 where the hysteresis variation flag is set. Then process flow goes to step S6106 shown in FIG. 25. On the other hand, if the absolute value of the steering angular velocity is less than or equal to 180°/sec in step S6203, process flow goes directly to step S6106.

The query in step S6205 judges whether or not the absolute value of the steering angular velocity is smaller than 180°/sec. If it is smaller than 180°/sec, process flow goes to step S6206 where the hysteresis variation flag is cleared. Then process flow goes to step S6106 shown in FIG. 25. If the absolute value of the steering angular velocity is equal to or greater than 180°/sec in step S6205, process flow goes directly to step S6106.

Figure 9:
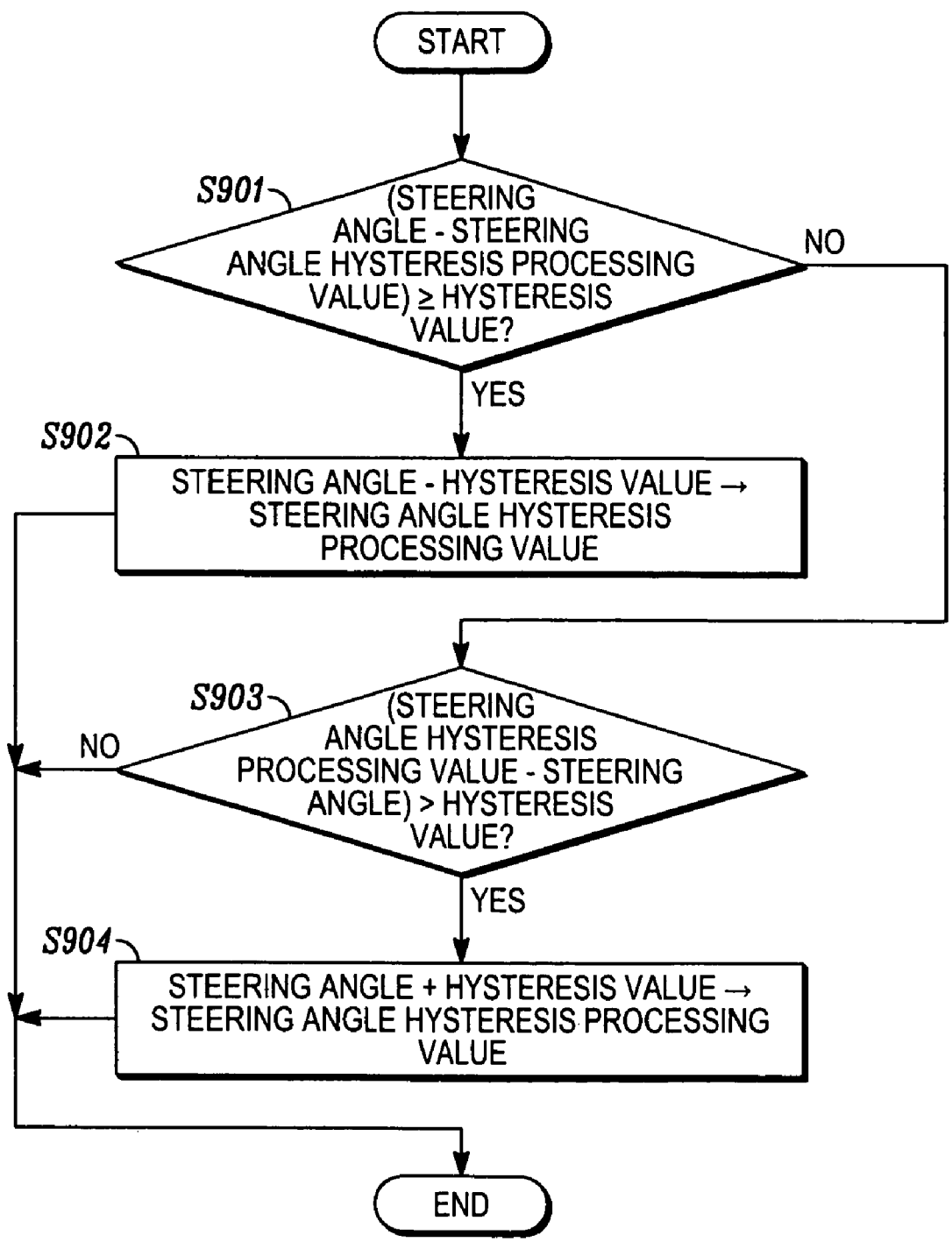
FIG. 9 is a flow chart illustrating the steering angle hysteresis processing value computing processing in the vehicle headlamp device in accordance with the first application example.

In the following, and with reference to FIG. 9, a more detailed explanation is given regarding the steering angle hysteresis processing value computation in step S803 of FIG. 8. Here, the hysteresis value is the value of the hysteresis width (such as the width of 74a, 74b, 74c, 74d, etc., in FIG. 11).

Process flow begins with a query in step S901 that judges whether or not the value obtained by subtracting the steering angle hysteresis processing value from the steering angle is larger than the hysteresis value. If the resulting value is equal to or greater than the hysteresis value, process flow goes to step S902. In step S902, the value obtained by subtracting the hysteresis value from the steering angle is taken as the steering angle hysteresis processing value. The steering angle hysteresis processing value computing processing of step S803 then ends.

On the other hand, if the resulting value is smaller than the hysteresis value in step S901, process flow goes to step S903. The query in step S903 judges whether or not the value obtained by subtracting the steering angle from the steering angle hysteresis processing value is larger than the hysteresis value. If YES, process flow goes to step S904. If NO, no change is made to the steering angle hysteresis processing value, and the steering angle hysteresis processing value computing processing of step S803 ends. In step S904, the value obtained by adding the steering angle and the hysteresis value is taken as the steering angle hysteresis processing value. Then, the steering angle hysteresis processing value computing operation of step S803 ends.

In some embodiments, a different process can be used. A first result is obtained by subtracting a prescribed steering angle hysteresis processing value from the steering angle. This first result is compared to the hysteresis value. A second result is obtained by subtracting the steering angle from the prescribed steering angle hysteresis value. This second result is compared to the hysteresis value. The prescribed steering angle hysteresis processing value is assigned to the steering angle hysteresis processing value when the first result is smaller than the hysteresis value and the second result is equal to or smaller than the hysteresis value.

In the following, the offset processing in step S2801 of FIG. 8 is explained with reference to the flow charts shown in FIGS. 29 and 30. Also, the offset processing corresponds to the conditions shown in FIG. 28.

Figure 29:
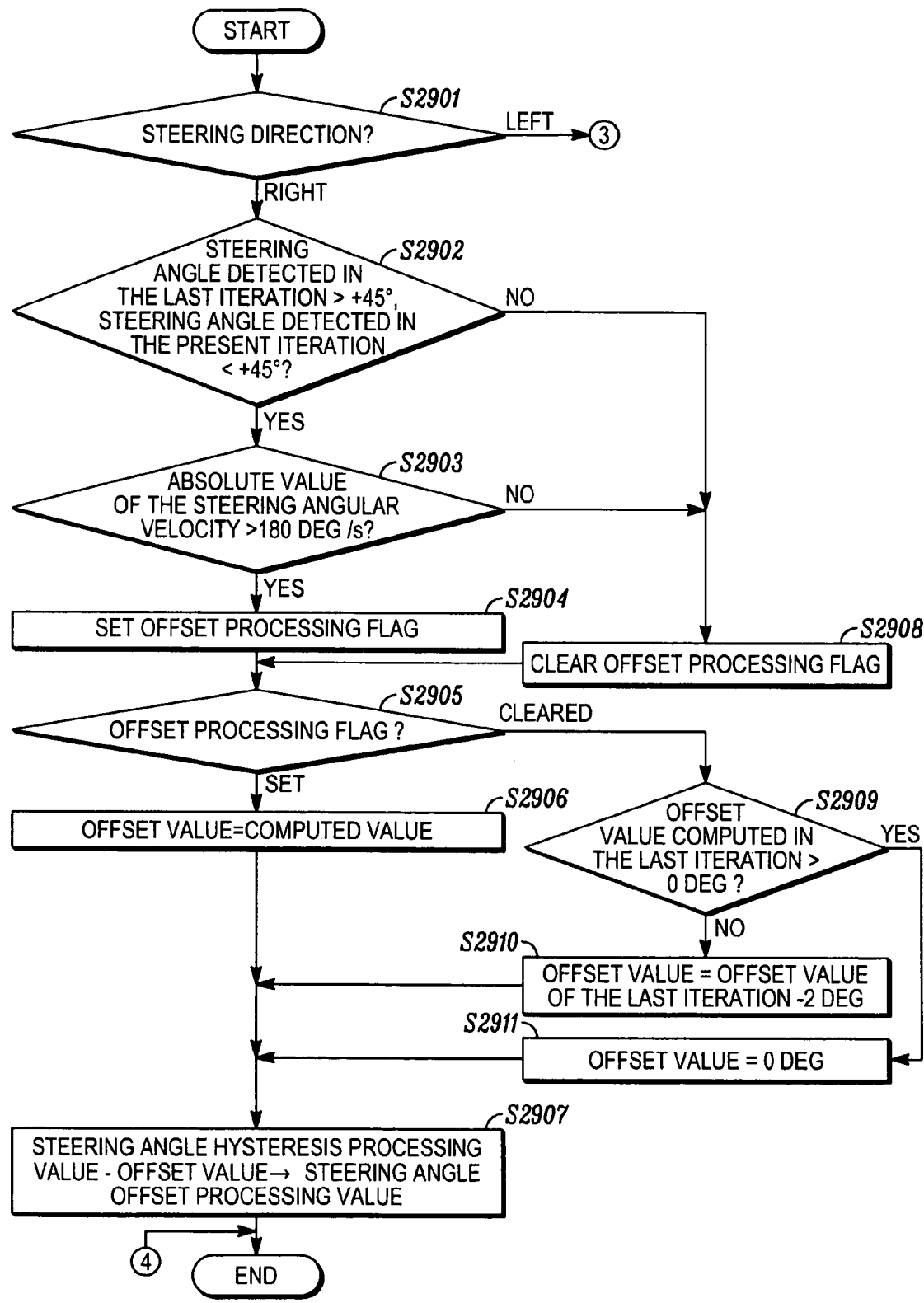
FIG. 29 is a flow chart illustrating the offset processing in accordance with the first application example.

Starting with FIG. 29, the query in step S2901 judges whether the steering direction is to the right or to the left. When the steering direction is to the left, process flow goes to step S3001 shown in FIG. 30 and discussed hereinafter. When the steering direction is to the right, process flow goes to the query in step S2902, which judges whether the steering angle detected in the last iteration is larger than 45° and the steering angle detected in the present iteration is smaller than 45°. If these conditions are met, process flow advances to step S2903. Otherwise, at least one of the conditions is not met, and process flow advances to step S2908 where the offset processing flag is cleared. Processing then advances to step S2905.

In the query of step S2903, a judgment is made as to whether the absolute value of the steering angular velocity is larger than 180°/sec. If the absolute value is larger than 180°/sec, process flow advances to step S2904 where the offset processing flag is set. Process flow then goes to step S2905. On the other hand, if the absolute value of the steering angular velocity is less than or equal to 180°/sec in step S2903, process flow goes to step S2908 where the offset processing flag is cleared. Process flow then goes to step S2905.

The query in step S2905 judges whether the offset processing flag is set or cleared. When the flag has been set, process flow advances to step S2906. In step S2906, the offset value is taken as the computed value. Here, the offset value is the value for controlling the steering angle offset processing value so that the swivel angle of swiveling lamps 17a, 17b is not delayed relative the steering angle of the steering wheel. Also, the computed value is the offset value computed from the absolute value of the steering angular velocity by means of the absolute value of steering angular velocity versus offset value curve 311 shown in FIG. 31. The absolute value of steering angular velocity versus offset value curve 311 shown in FIG. 31 serves for computing the offset value needed to prevent delay in changing the light emission direction of swiveling lamps 17a, 17b during the steering operation. Consequently, the computed value of the offset value increases as the absolute value of the steering angular velocity increases. Then, in order to prevent the light emission direction of swiveling lamps 17a, 17b from making a significant over-rotation during the steering operation when a prescribed absolute value of the steering angular velocity is exceeded, the offset approaches a constant value. Returning now to FIG. 29, after step S2906, in step S2907 the value obtained by subtracting the offset value from the steering angle hysteresis processing value is taken as the steering angle offset processing value.

Alternatively, when in response to the query in step S2905 it is judged that the offset processing flag has been cleared, process flow advances to step S2909.

The query in step S2909 judges whether or not the offset value computed in the last iteration is larger than 0°. If the offset value is larger than 0°, process flow advances to step S2910 where the value obtained by subtracting 2° from the offset value computed in the last iteration is taken as the offset value. On the other hand, if the offset value is equal to or less than 0°, process flow advances to step S2911 where the offset value is set at 0°. In either case, process flow goes to step S2907, which sets the steering angle offset processing value as the steering angle hysteresis processing value minus the offset value. Hence, when the offset value is 0°, the steering angle hysteresis processing value becomes the steering angle offset processing value. Processing of step S2801 then ends.

Figure 30:
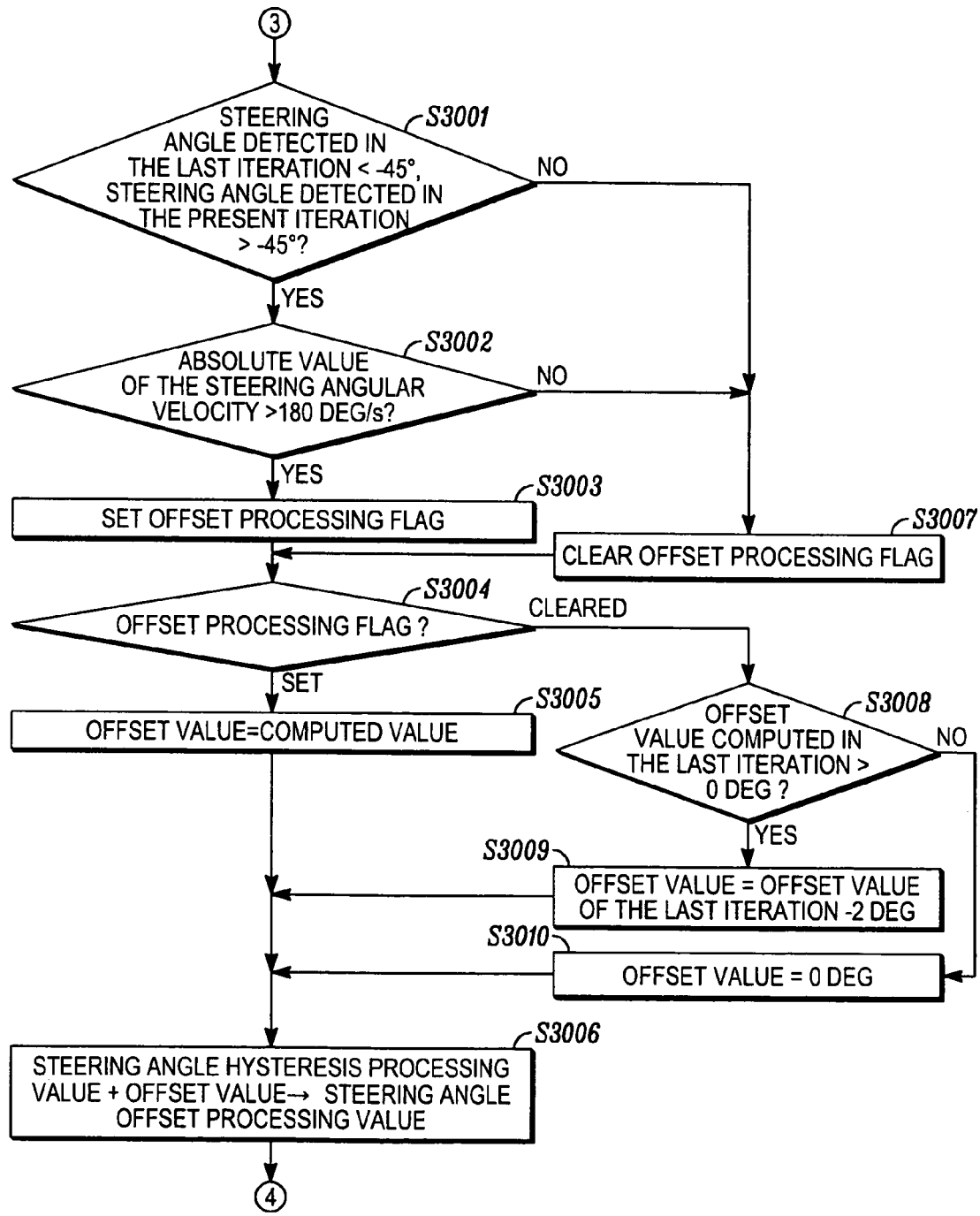
FIG. 30 is a flow chart illustrating the offset processing in accordance with the first application example.

When the steering direction in step S2901 of FIG. 29 is the left direction, process flow advanced to step S3001 shown in FIG. 30. The query of step S3001 judges whether the steering angle detected in the last iteration is smaller than −45° and the steering angle detected in the present iteration is larger than −45°. If at least one of these conditions is not met, process flow advances to step S3007 where the offset processing flag is cleared. After step S3007, process flow advances to step S3004.

If both of the conditions in step S3001 are met, process flow advances to step S3002. The query in step S3002 judges whether or not the absolute value of the steering angular velocity is larger than 180°/sec. If the absolute value is larger than 180°/sec, process flow goes to step S3003 where the offset processing flag is set. Then, process flow advances to step S3004. On the other hand, the query in step S3002 indicates that the absolute value of the steering angular velocity is equal to or less than 180°/sec, process flow advances to step S3007 and then to step S3004.

The query in step S3004, whether it is reached via step S3003 or step S3007, judges whether the offset processing flag is set or cleared. If the flag has been set, process flow goes to step S3005. In step S3005, the offset is taken as the value computed using absolute value of steering angular velocity versus offset value curve 311 shown in FIG. 31. In the next step, step S3006, the value obtained by adding the offset value to the steering angle offset processing value is taken as the steering angle offset processing value. The offset processing then ends.

If, however, in response to the query in step S3004, it is indicated that the offset processing flag has not been set, process flow advances to step S3008. The query in step S3008 judges whether or not the offset value computed in the last iteration is larger than 0°. When the offset value computed in the last iteration is larger than 0°, process flow goes to step 3009 where the value obtained by subtracting 2° from the offset value computed in the last iteration is taken as the offset value. When the offset value computed in the last iteration is equal to or less than 0°, process flow goes to step S3010 where the offset value is set at 0°. After either step S3009 or step S3010, process flow goes to step S3006. In step S3006, the steering angle offset processing value is set as the steering angle hysteresis processing value plus the offset value. After step S3006, processing of step S2801 of FIG. 8 then ends as shown in FIG. 28.

Alternatively, a first result is obtained by subtracting a prescribed steering angle hysteresis processing value from the steering angle offset processing value. This first result is compared to the hysteresis value. A second result is obtained by subtracting the steeling angle offset processing value from the prescribed steering angle hysteresis value. This second result is compared to the hysteresis value. The prescribed steering angle hysteresis processing value is assigned to the steering angle hysteresis processing value when the first result is smaller than the hysteresis value and the second result is equal to or smaller than the hysteresis value.

In some embodiments, a different process can be used to select a sum of the steering angle and the offset value as the steering angle offset processing value when the entry into the reverse curve is detected and the steering angle increases, and otherwise to select the steering angle as the steering angle offset processing value.

Vehicle headlamp device 1 as described has the following functions and effects.

First, even when the actual steering angle of the steering wheel varies within the hysteresis range, swiveling lamps 17a, 17b are still not driven. Consequently, swiveling lamps 17a, 17b are not driven when the driver turns the steering wheel in minute amounts. The driver is not disconcerted or influenced by minute movement of the headlamps.

In addition, when the actual steering angle of the steering wheel departs from the hysteresis range, swiveling lamps 17a, 17b are driven according to the actual steering angle until the actual steering angle changes to return into the hysteresis range. Incidentally, when the hysteresis range is set with a central focus on the actual steering angle outside of the hysteresis range, and swiveling lamps 17a, 17b are further driven when the actual steering angle is outside of the hysteresis range, swiveling lamps 17a, 17b are driven stepwise, and the driver can feel disconcerted. On the other hand, according to the invention, lamp driving is performed smoothly according to the steering angle, so that the driver is not disconcerted.

When absolute value 101 of the steering angular velocity of the steering wheel exceeds a prescribed value, the hysteresis width becomes smaller. Consequently, when the driver performs quick steering operations, driving of swiveling lamps 17a, 17b is quickly started, and it is possible make the light emission direction of swiveling lamps 17a, 17b match the direction of the driver's field of view without delay.

When vehicle speed 151 is increased, hysteresis widths 74a, 74b become smaller. Consequently, when the vehicle speed is high, driving of swiveling lamps 17a, 17b is started quickly in correspondence to the steering operations of the driver, and it is possible to make the light emission direction of swiveling lamps 17a, 17b match the direction of the driver's field of view without delay in the driver's field of view.

When absolute value 101 of the steering angular velocity of the steering wheel exceeds a prescribed value when running on a substandard road, the hysteresis range becomes wider. Even when the driver performs rapid steering operations when he/she can barely hold the steering wheel steady, there is still no unnecessary rotation in swiveling lamps 17a, 17b. Hence, the driver does not feel disconcerted by unnecessary movements of the headlamps and is not guided by unnecessary movements of swiveling lamps 17a, 17b.

When it is detected that the vehicle is entering a left curving road from a right curving road or enters a right curving road from a left curving road, the light emission direction is computed taking the detection result into consideration, and swiveling lamps 17a, 17b are controlled to point in the light emission direction. In the following, such a curve entry will be called a reverse curve entry. According to embodiments of the invention, the light emission direction of swiveling lamps 17a, 17b quickly follows the movement of the driver's sight line, and it is possible to ensure the driver's field of view.

It is possible to detect a reverse curve entry by detection as discussed herein. More specifically, the steering wheel passes through a prescribed steering angle in the right direction with respect to the straight running direction and towards the left at steering angular velocity with an absolute value larger than a prescribed value. Or, the steering wheel passes through a prescribed steering angle in the left direction with respect to the straight running direction and towards the right at steering angular velocity with an absolute value larger than the prescribed value. When such a reverse curve entry is detected, because the hysteresis value is the special mode value, the hysteresis width is made narrower. Therefore, the response property of the rotation of swiveling lamps 17a, 17b with respect to the steering operation until the reverse curve entry is improved. Consequently, the light emission direction of swiveling lamps 17a, 17b can quickly follow movement in the driver's sight line, and the driver's field of view can be ensured.

The hysteresis value becomes smaller as the absolute value of the steering angular velocity increases. Consequently, even when the driver performs quick steering operations, the light emission direction of swiveling lamps 17a, 17b can still quickly follow movement of the driver's sight line.

As also described herein, the approaching of a curve ahead of the vehicle position is detected. As the distance to the curve becomes smaller, the hysteresis width in the curve direction becomes smaller. As a result, at the corner the response of the light emission direction of swiveling lamps 17a, 17b to the steering angle of the steering wheel is better, and the light emission direction of swiveling lamps 17a, 17b can quickly follow movement in the driver's sight line. Consequently, it is possible to ensure the driver's field of view.

Because the map data of navigation system 21 that stores the shape of the road is used to detect curves in the road, it is possible to detect a corner ahead of the vehicle position with high accuracy.

It is also possible to detect a steering operation for reverse curve entry by other detection steps. For example, such a curve is detected when the steering wheel passes through a prescribed steering angle in the right direction with respect to the straight running direction, towards the left at a steering angular velocity with an absolute value larger than a prescribed value (decrease in the steering angle), or the steering wheel passes through a prescribed steering angle in the left direction with respect to the straight running direction, towards the right at a steering angular velocity with an absolute value larger than the prescribed value (increase in the steering angle). When such a variation in the steering operation for reverse curve entry is detected, when the steering angle is decreased, the swivel angle of swiveling lamps 17a, 17b is computed based on the value obtained by subtracting the offset value from the steering angle hysteresis processing value. In contrast, when the steering angle is increased the swivel angle of swiveling lamps 17a, 17b is computed based on the sum of the steering angle hysteresis processing value and the offset value. Consequently, the rotational response of swiveling lamps 17a, 17b with respect to the steering operation for reverse curve entry is improved. The light emission direction of the swiveling lamps can therefore quickly follow movement in the driver's sight line, and the driver's field of view can be improved.

The offset value increases as the absolute value of the steering angular velocity rises. As a result, even when the driver performs quick steering operations the light emission direction of swiveling lamps 17a, 17b can quickly follow movements in the driver's sight line.

Right and left turns of the vehicle running direction are detected, and the hysteresis width respectively pertaining to the right/left turn direction is reduced. Consequently, when the vehicle makes such turns, the light emission direction of swiveling lamps 17a, 17b can quickly follow movements of the driver's sight line. As a further advantage, because right/left turns can be detected by means of the vehicle speed sensor and the blinker that is usually provided on each vehicle, there is no need to provide any new device for detecting the right/left turns.

Figure 12:
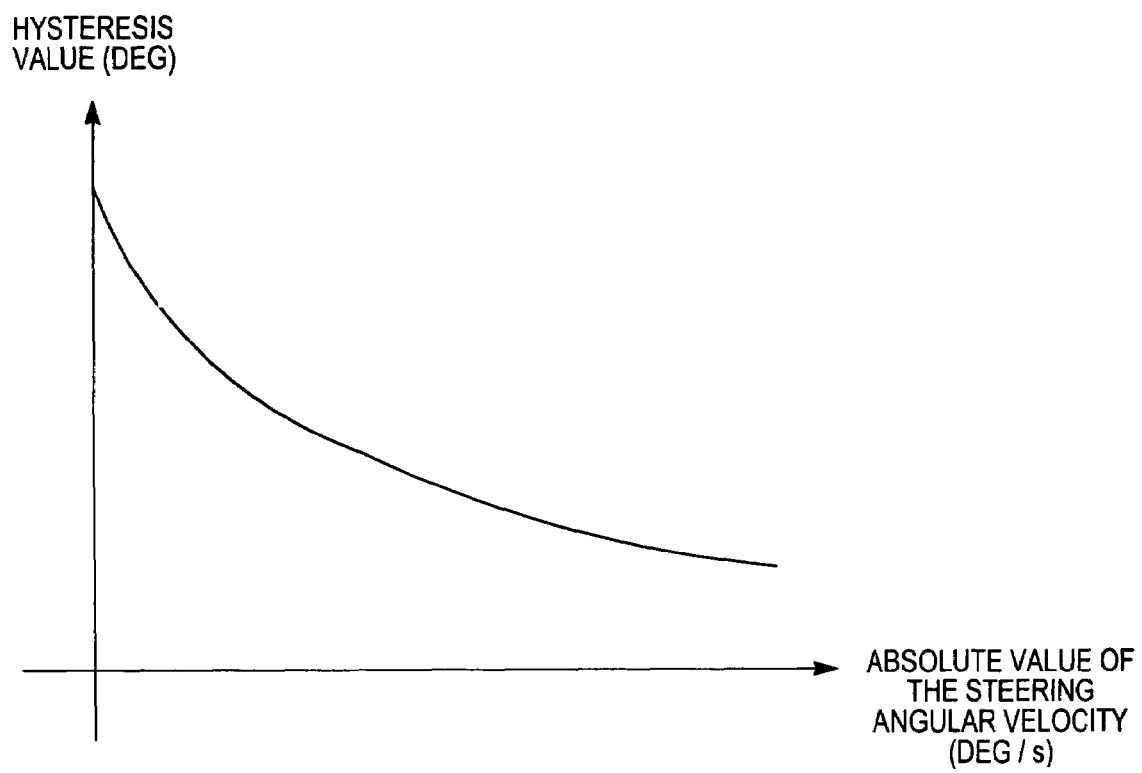
FIG. 12 is a graph illustrating another relationship between the absolute value of the steering angular velocity and the hysteresis value in accordance with a modified application example.

In the application example discussed thus far, when absolute value 101 of the steering angular velocity of the steering wheel exceeds J1, the hysteresis value (defined value K2 or the like) decreases stepwise from hysteresis value K2a to K2b (see FIG. 10). However, as shown in FIG. 12, a modified example can also be implemented in which the hysteresis value gradually decreases as the absolute value of the steering angular velocity of the steering wheel is increased. In the following, the swivel angle control of swiveling lamps 17a, 17b when the hysteresis value varies gradually, as shown in FIG. 12, will be explained with reference to FIG. 13. In the figures it is assumed that the driver turns the steering wheel after a minute steering operation.

Figure 13:
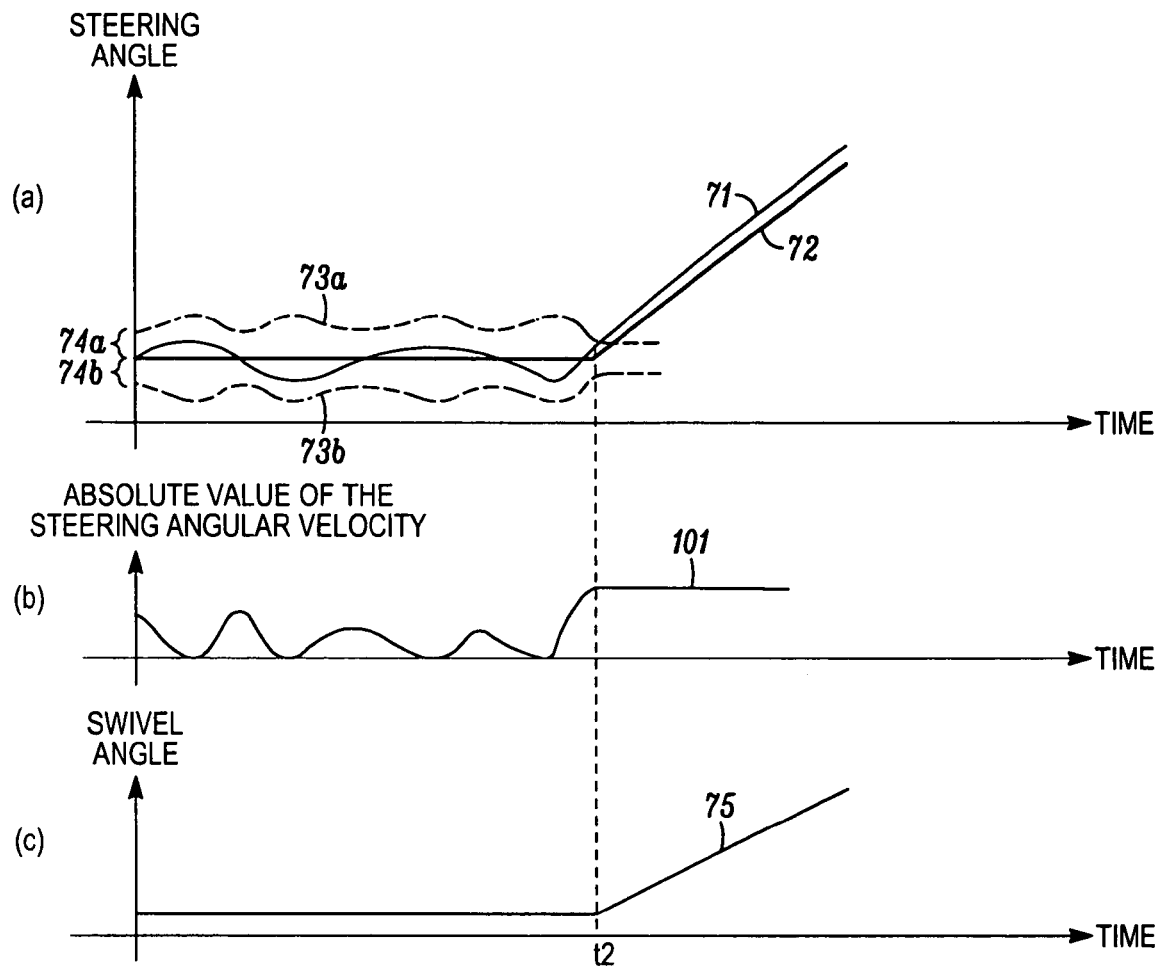
FIG. 13 includes graphs illustrating the swivel angle control of the swiveling lamp at the hysteresis value shown in FIG. 12.

Graph (a) of FIG. 13 illustrates the steering angle and the steering angle hysteresis processing value of the steering wheel. Line 71 shows the actual steering angle of the steering wheel, and line 72 shows the steering angle hysteresis processing value. As the absolute value of the steering angular velocity is increased, hysteresis widths 74a, 74b become smaller. Graph (b) shows absolute value 101 of the steering angular velocity for the steering wheel. Graph (c) shows swivel angle 75 of swiveling lamps 17a, 17b. At time t2, actual steering angle 71 departs from the hysteresis range defined by lines 73a, 73b.

At time t2, because actual steering angle 71 of the steering wheel remains within the hysteresis range defined by lines 73a, 73b, although actual steering angle 71 varies steering angle hysteresis processing value 72 remains constant. Consequently, swivel angle 75 remains constant until time t2. As time t2 nears, absolute value 101 of the steering angular velocity becomes larger, and the hysteresis value becomes smaller in conjunction with this increase. As a result, the hysteresis range defined by lines 73a, 73b becomes narrower.

At time t2, actual steering angle 71 increases and departs from the hysteresis range defined by lines 73a, 73b. Hence, steering angle hysteresis processing value 72 starts increasing, and, at time t2, swivel angle 75 also starts increasing. After time t2, steering angle hysteresis processing value 72 increases together with actual steering angle 71. After time t2, swivel angle 75 also increases.

As explained above, hysteresis widths 74a, 74b gradually become smaller as absolute value 101 of the steering angular velocity of the steering wheel is increased. Thus, when the driver performs quick steering operations, in the optimum state fit to the steering angular velocity driving of swiveling lamps 17a, 17b starts quickly, and the light emission direction of swiveling lamps 17a, 17b can be set in the direction of the driver's field of view without delay. Also, the hysteresis value can be set constant irrespective of the absolute value of the steering angular velocity.

When the swivel angle control value is computed in the first application example, target swivel angle map 60 of target swivel angle curves 61a-61c that represents the optimum swivel angle corresponding to the steering angle hysteresis processing value at each vehicle speed is used (see FIG. 6). However, in a second modified example of the invention, a scheme can also be adopted in which the swivel angle control value is computed using a target swivel angle map of the target swivel angle curve that represents the optimum swivel angle corresponding to the steering angle hysteresis processing value alone.

In the first application example, the swivel angle control value is computed using the steering angle offset processing value obtained by offset processing of the steering angle hysteresis processing value. A third modified example can be implemented in which the steering angle is subjected to offset processing, the steering angle hysteresis processing value is computed from this processing value, and the computed steering angle hysteresis processing value is used to compute the swivel angle control value. Swivel angle control in this case is shown in the flow chart of FIG. 32.

Figure 32:
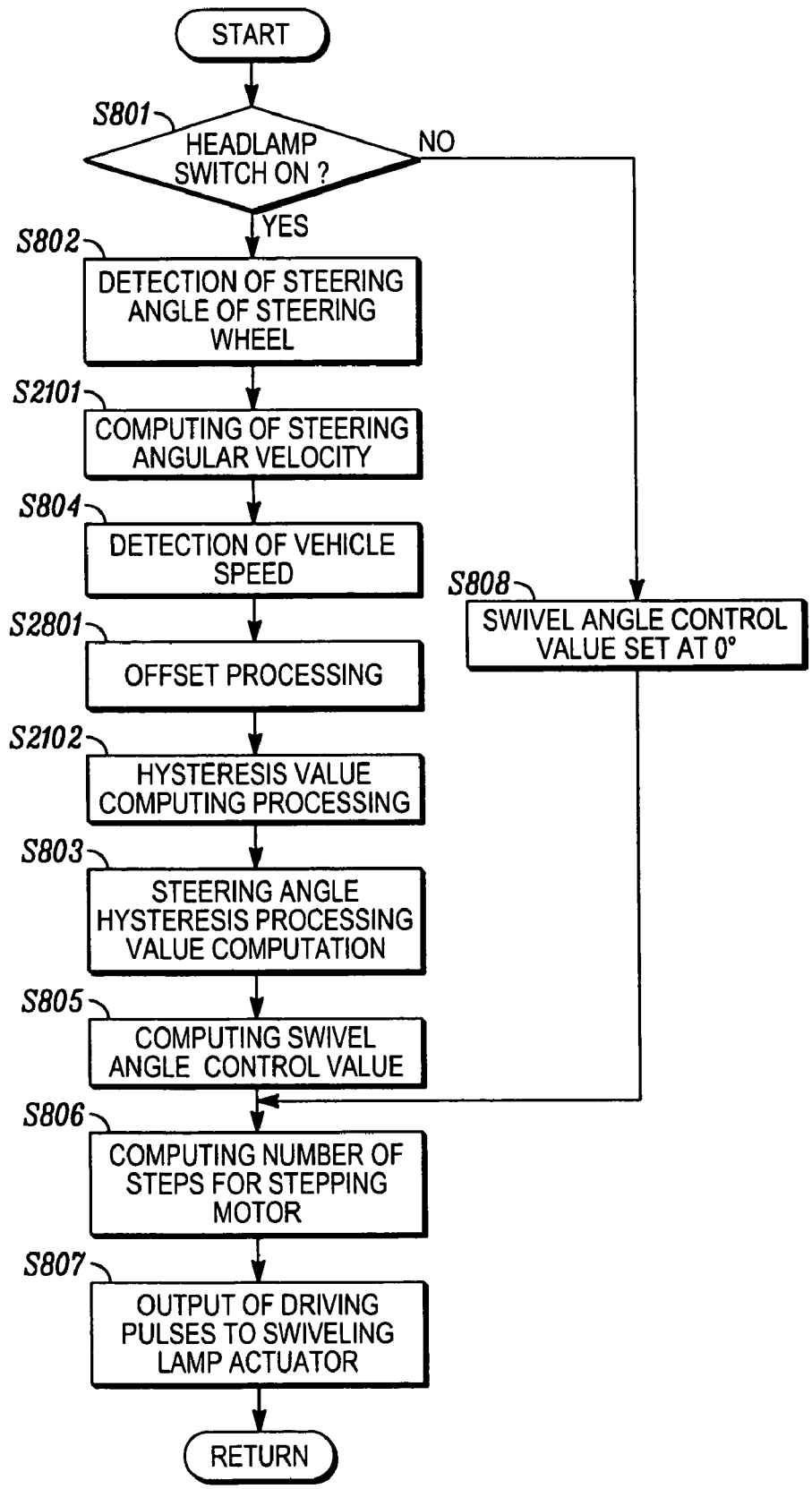
FIG. 32 is a flow chart illustrating the swivel angle control of the swiveling lamp by means of offset processing of the steering angle in the vehicle headlamp device in accordance with a third application example.
Figure 33:
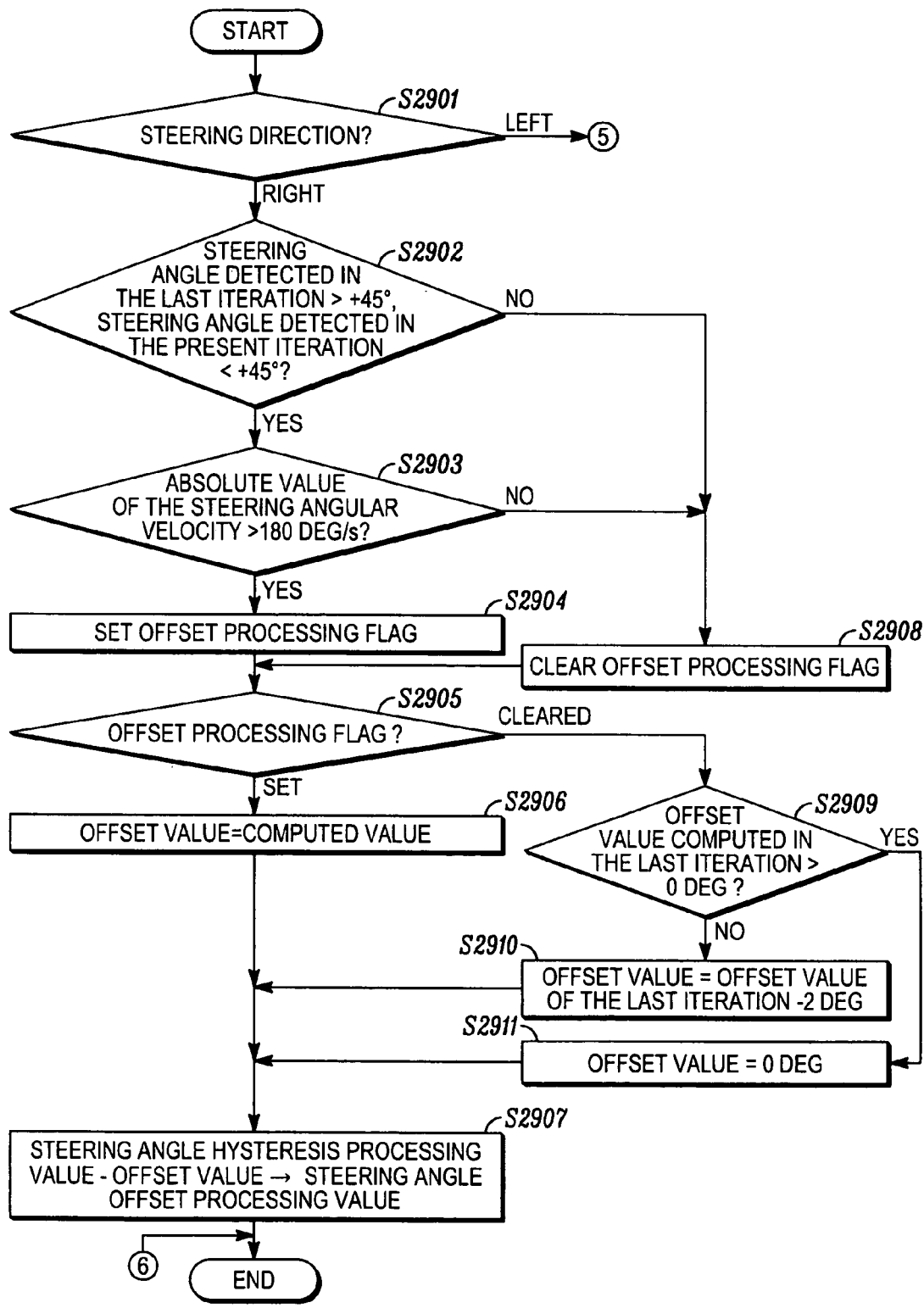
FIG. 33 is a flow chart illustrating the offset processing of the steering angle in accordance with the third application example.
Figure 34:
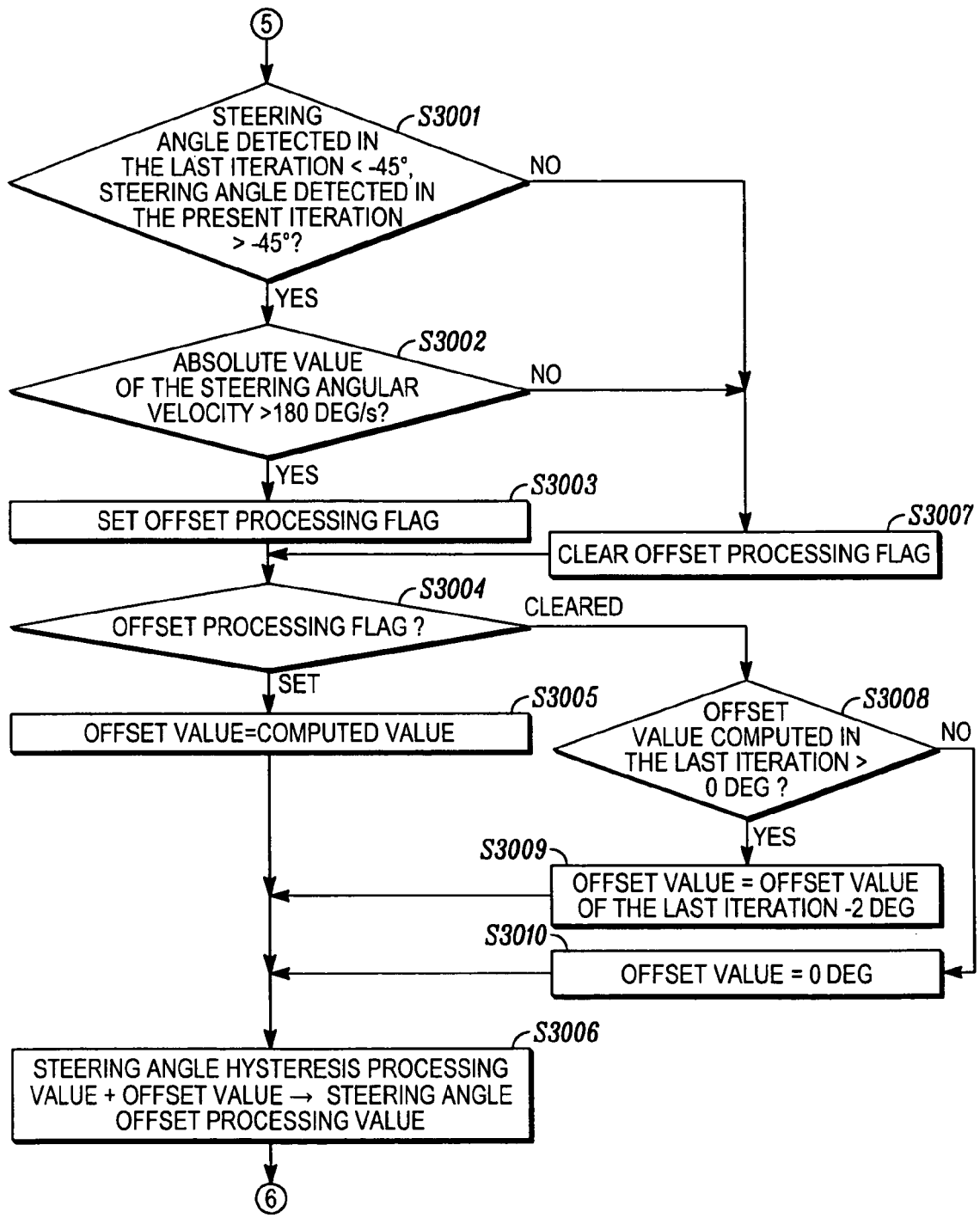
FIG. 34 is a flow chart illustrating the offset processing of the steering angle in accordance with the third application example.

When compared with the flow chart in FIG. 8 for swivel angle control of vehicle headlamp device 1, the flow chart shown in FIG. 32 differs in that the offset processing of step S2801 is performed before the hysteresis value computing processing in step S2102. Also, the offset processing in step S2801 in the case of offset processing of the steering angle is illustrated in the flow chart shown in FIGS. 33 and 34. Therein, the steering angle offset processing value in step S2907 shown in FIG. 33 becomes the value obtained by subtracting the offset value from the steering angle, and the offset processing value in step S3006 as shown in FIG. 34 becomes the sum of the steering angle value and the offset value.

Figure 38:
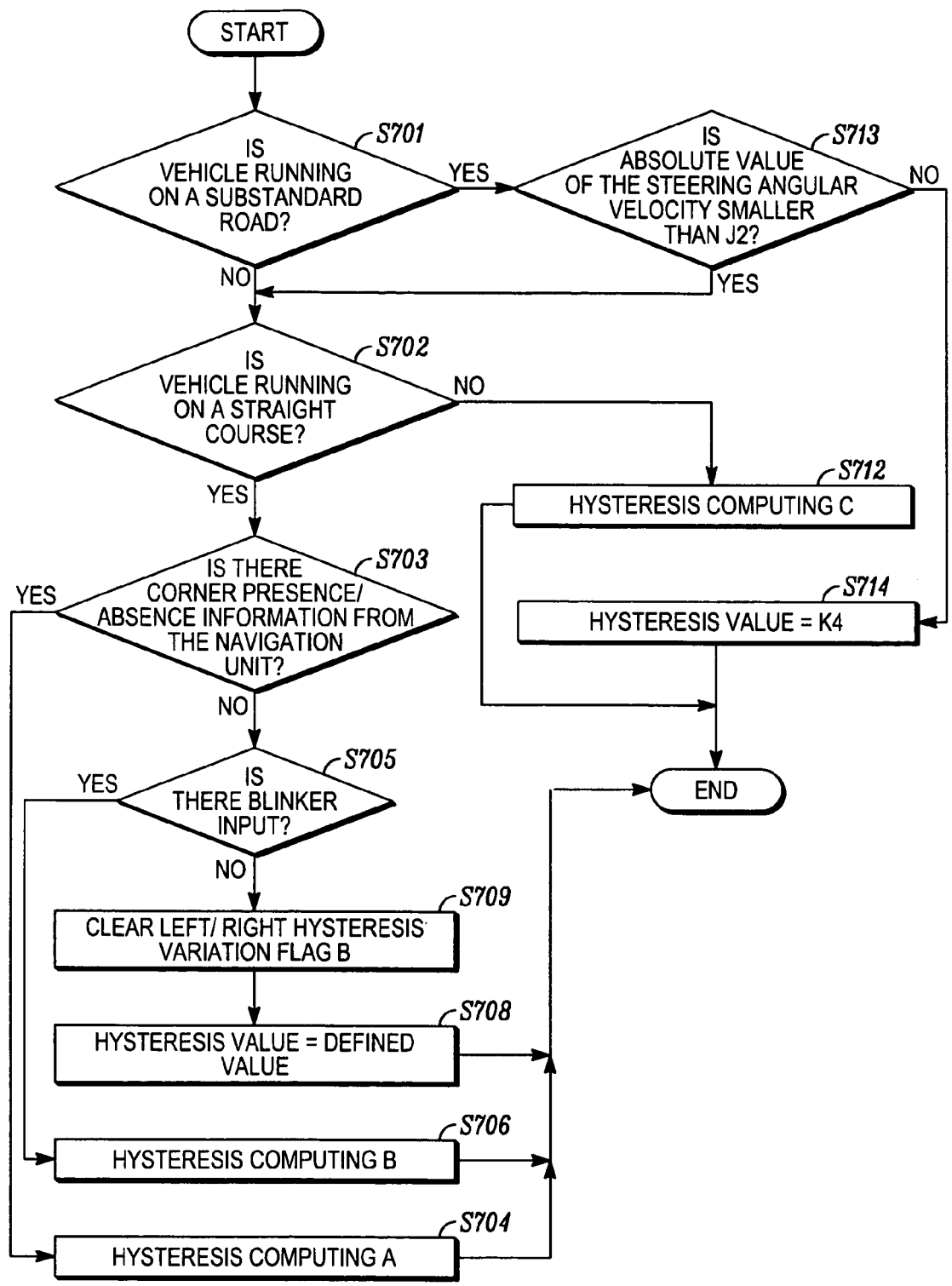
FIG. 38 is a flow chart illustrating the hysteresis value computing processing in the third application example.

For the hysteresis value computing processing in step S2102 of FIG. 32, which processing is shown in FIG. 38, there is no step pertaining to setting the offset processing permission flag that is in the first application example (FIG. 7, S710, S711).

Figure 35:
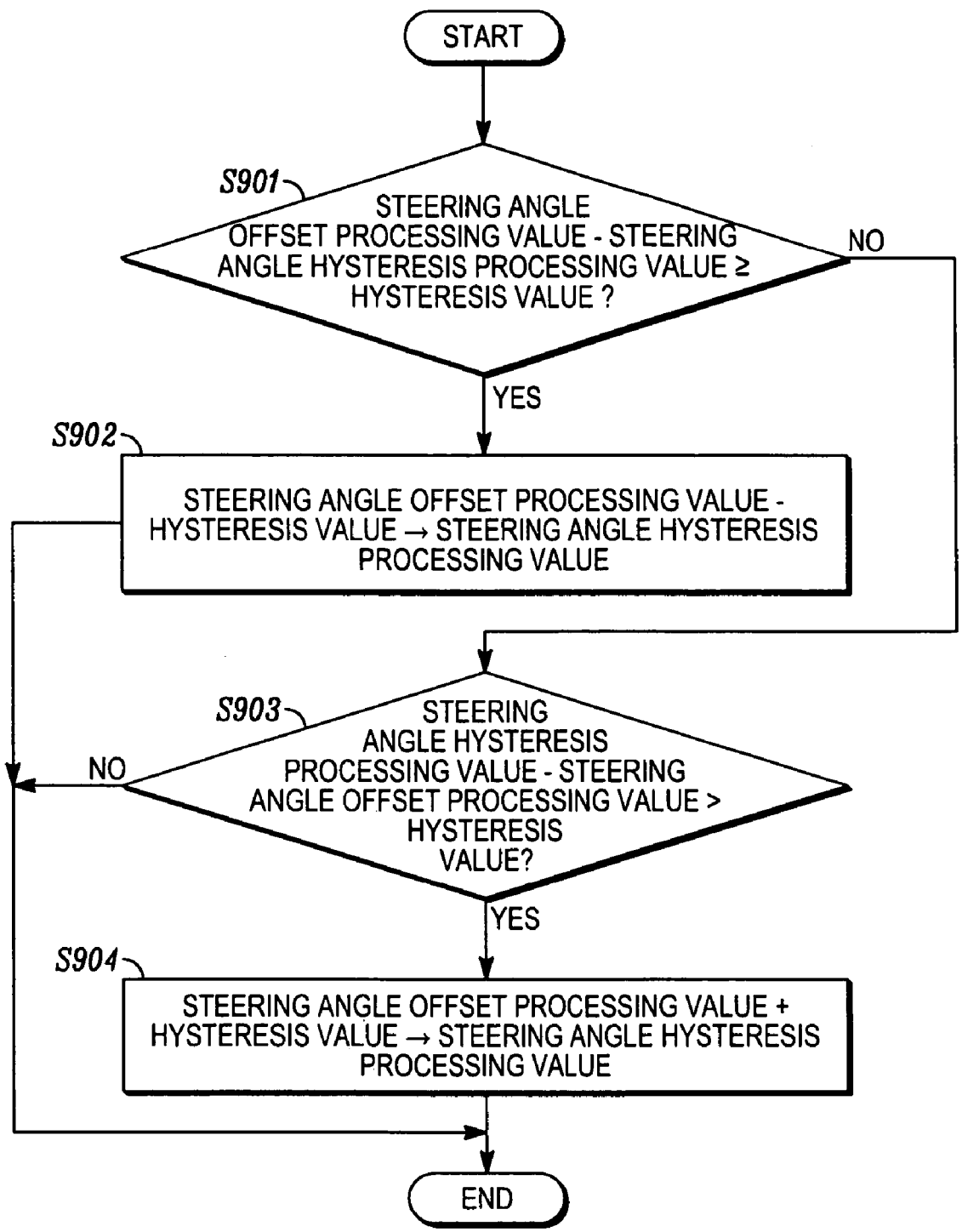
FIG. 35 is a flow chart illustrating the processing for computing the steering angle hysteresis processing value of the steering angle offset processing value computed in offset processing of the steering angle accordance with the third application example.

As shown in FIG. 35, in the steering angle hysteresis processing value computing processing in step S803 of FIG. 32 the steering angle offset processing value is used instead of the steering angle to compute the steering angle hysteresis processing value. Then, in step S805 of FIG. 32, the swivel angle control value is computed from the steering angle hysteresis processing value. In this case, also, the light emission direction of swiveling lamps 17a, 17b can quickly follow movements in the driver's sight line, and it is possible to ensure the driver's field of view.

Figure 31:
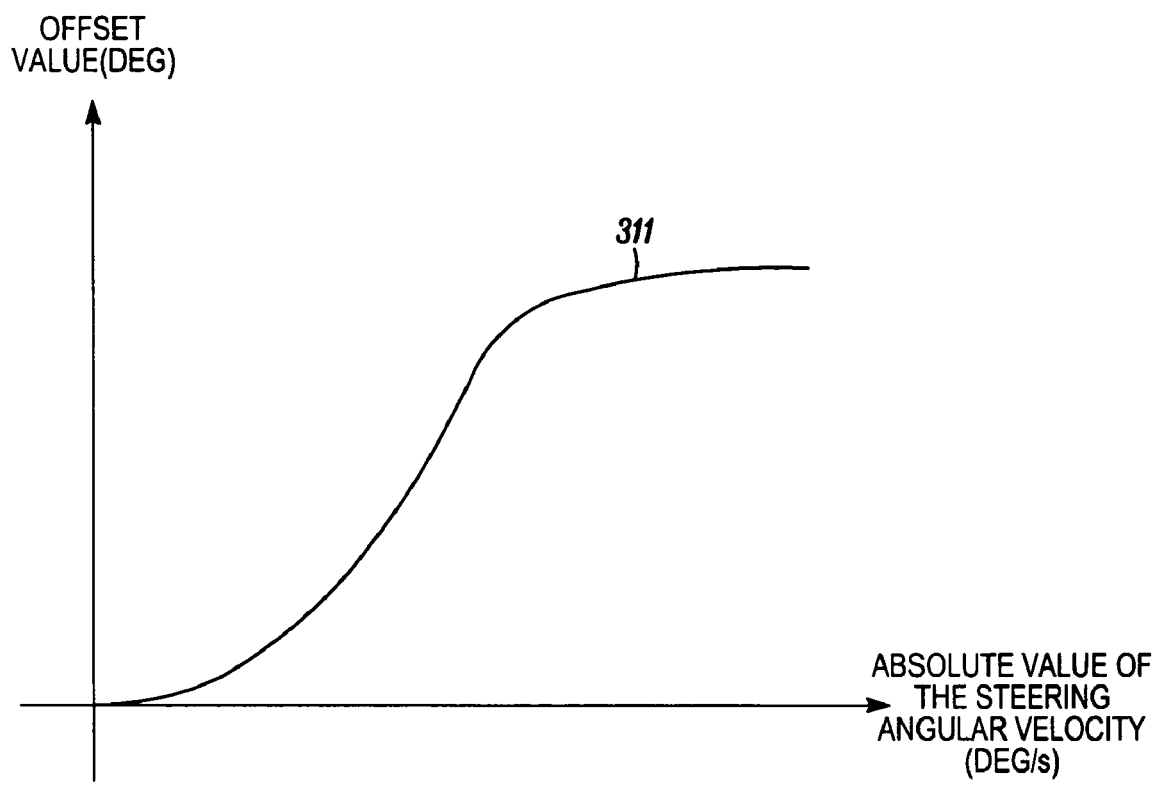
FIG. 31 is a graph illustrating the relationship between the absolute value of the steering angular velocity and the offset value in accordance with the first application example.

In the first application example, as shown in FIG. 31, the offset value becomes larger as the absolute value of the steering angular velocity is increased. However, in a fourth modified example, this relationship changes from that shown in FIG. 31. For example, the offset value can be a constant. Also, as shown in FIG. 31, the offset value becomes continuously larger as the absolute value of the steering angular velocity is increased. However, a scheme can also be adopted in which the offset value is increased stepwise.

As described in the first application example, reverse curve entry of the vehicle can be determined by detecting conditions where the steering wheel passes through a prescribed steering angle in the right direction with respect to the straight running direction and then towards the left at a steering angular velocity with an absolute value larger than a prescribed value, or the steering wheel passes through a prescribed steering angle in the left direction with respect to the straight running direction and then towards the right at a steering angular velocity with an absolute value larger than the prescribed value (see FIGS. 25, 26, 29, and 30). In a fifth modified application example, reverse curve entry of the vehicle is detected by detecting a steering angular velocity with an absolute value higher than prescribed (for example, 180°/sec) at a steering angle in a prescribed interval (near 0°, such as in the interval of −45° to +45° C.).

Figure 36:
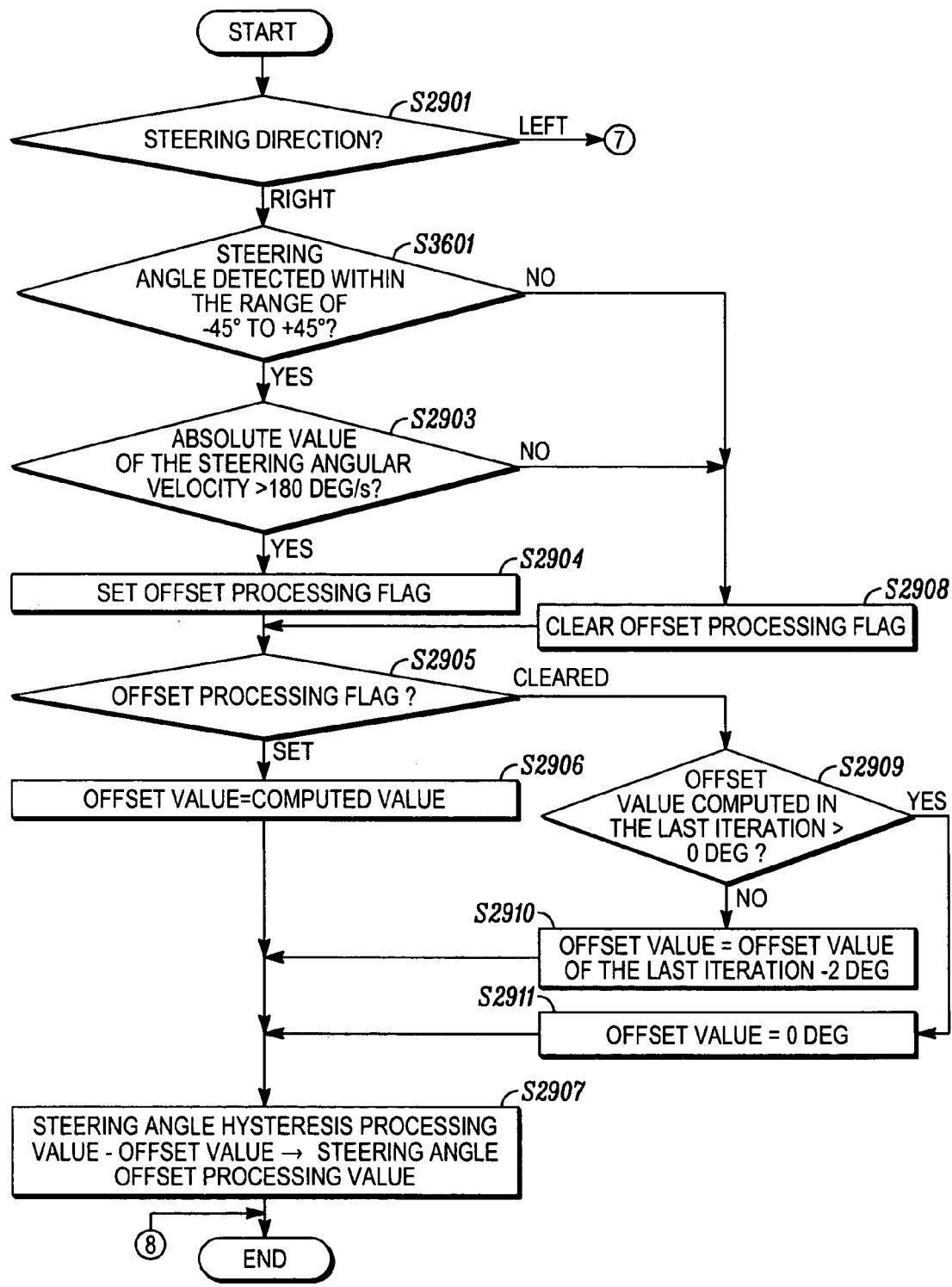
FIG. 36 is a flow chart illustrating the offset processing by another reverse curve entry detecting means in a fifth application example.
Figure 37:
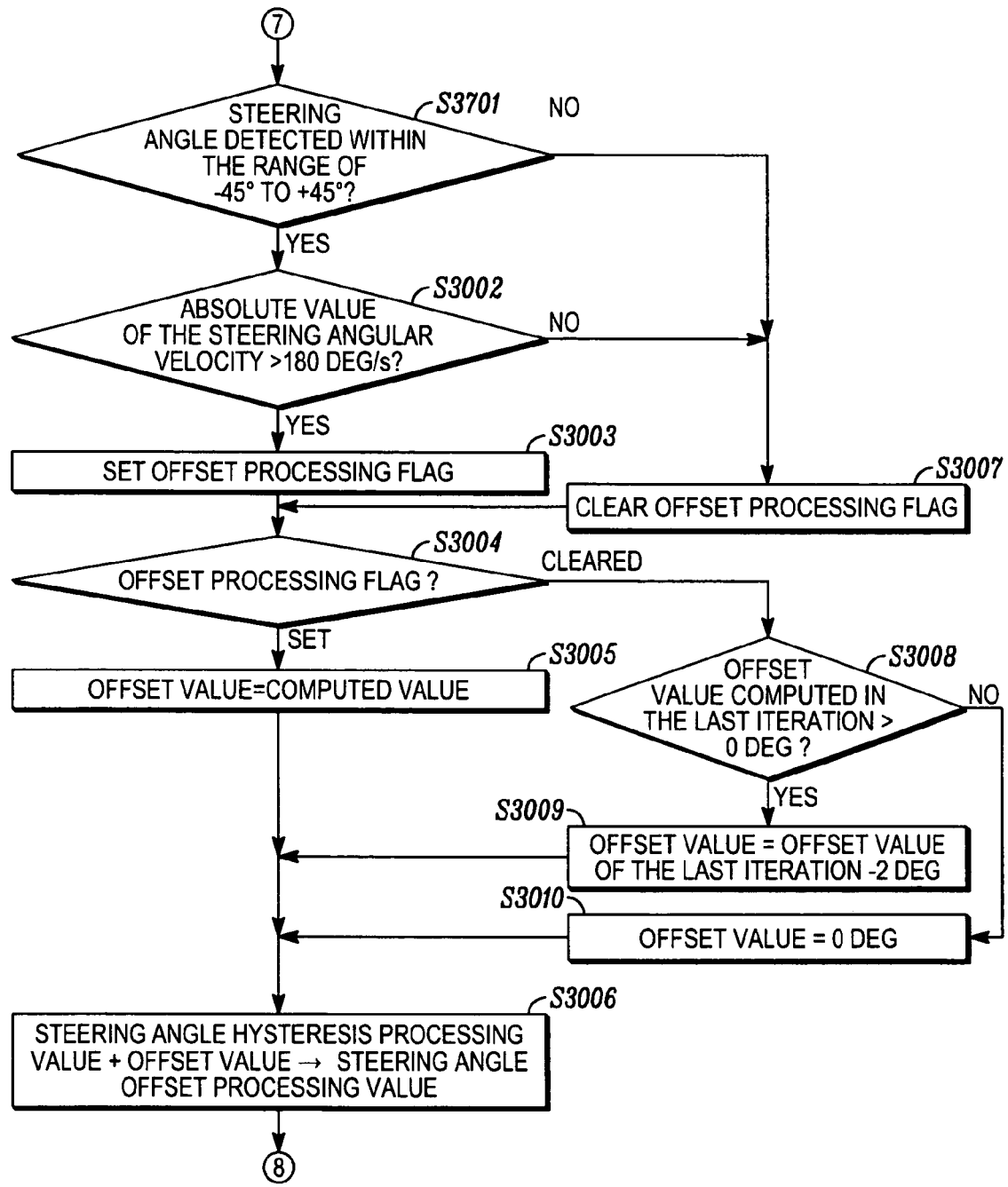
FIG. 37 is a flow chart illustrating the offset processing by another reverse curve entry detecting means in the fifth application example.

In the following, the offset processing of step S2801 in FIG. 8 in the case of detection of reverse curve entry by detecting the steering angular velocity within a prescribed interval (the steering angle interval from −45° to +45°) is explained with reference to FIGS. 36 and 37. This explanation mainly involves the portions different from the offset processing shown in FIGS. 29 and 30 as previously explained. The query in each of steps S3601 and 3701 of FIGS. 36 and 37, respectively, judges whether or not the steering angle is within the range from −45° to +45°. The query in each of steps S2903 and 3002 judges whether or not the absolute value of the steering angular velocity is larger than 180°/sec. In this way, also, it is possible to detect reverse curve entry, and just as in the case of vehicle headlamp device 1 in the first application example, the light emission direction of swiveling lamps 17a, 17b can quickly follow movements of the driver's sight line, and the driver's field of view can be ensured.

Figure 20:
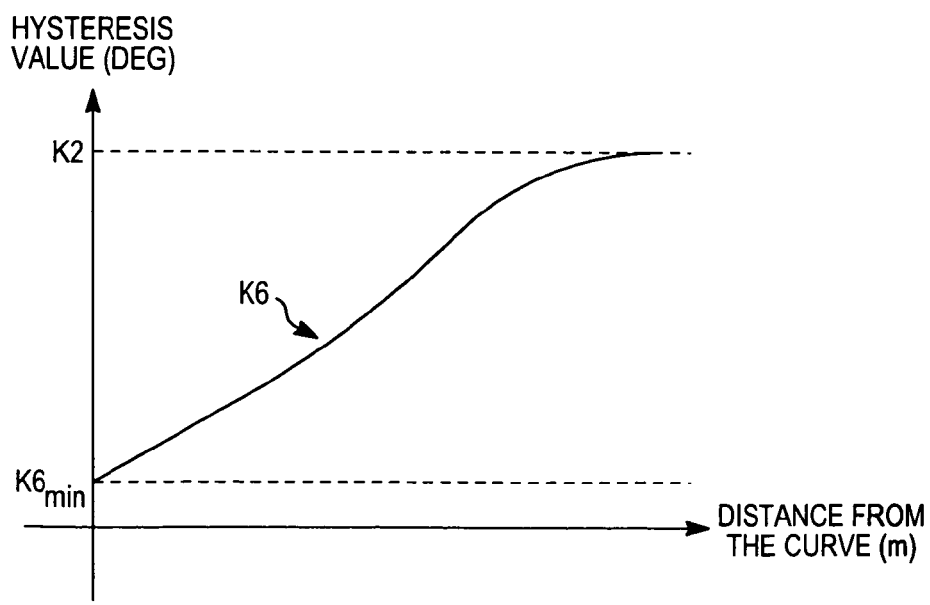
FIG. 20 is a graph illustrating the relationship between the distance to the corner and the hysteresis value according to hysteresis computing A.
Figure 39:
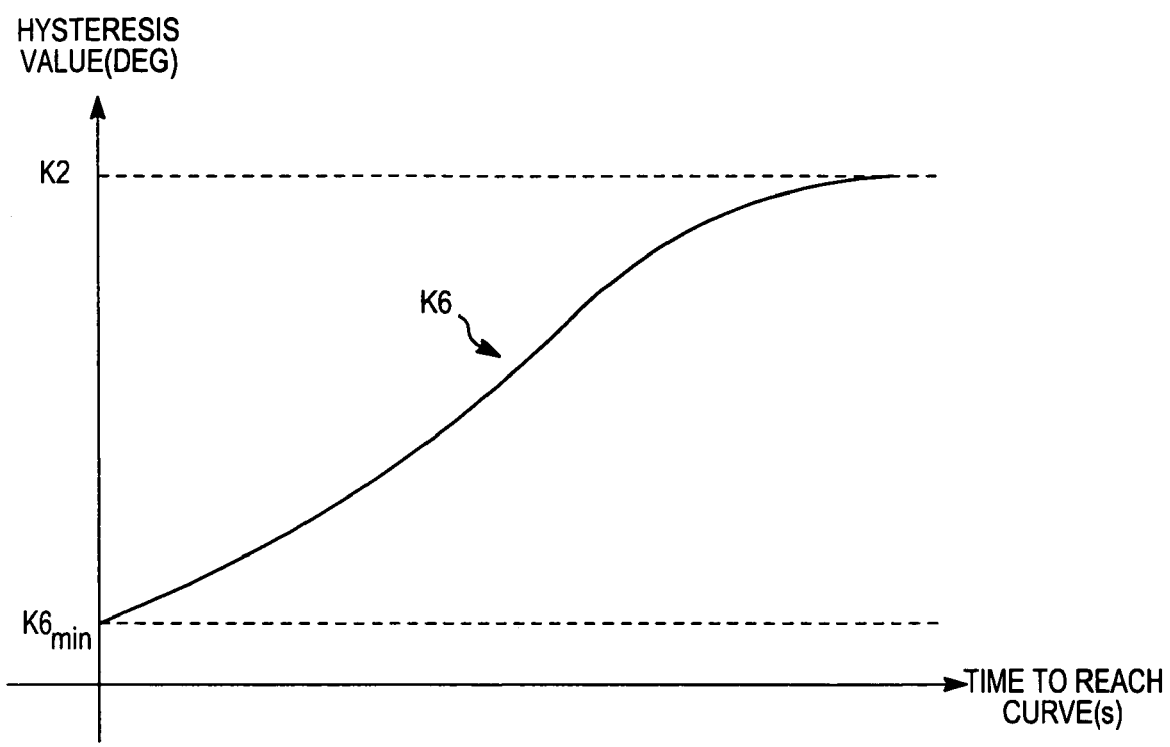
FIG. 39 is a graph illustrating the relationship between the time for reaching the corner and the hysteresis value in a sixth application example.

As shown in FIG. 20, in the first application example the table look-up value is computed from the relationship between the distance to the corner and the hysteresis value. This is not the only way to obtain the value. For example, in a sixth modified example, it can also be computed from the relationship between the time to reach the corner and the hysteresis value. The time to reach the corner is computed by dividing the distance to the corner by the present vehicle speed. Then, as shown in FIG. 39, the table look-up value is computed from the relationship between the time to reach the corner and the hysteresis value. As also shown in FIG. 39, the hysteresis value becomes smaller as the time to reach the corner becomes shorter.

In the first application example, deceleration of the vehicle is detected by vehicle speed sensor 14 as shown in FIG. 1. This is not necessary, however. In a seventh modified example, instead of the vehicle speed sensor detection is performed from a state such as the state of the brake switch and the state of the acceleration pedal, and it can also be detected from not one but a combination of these states.

As described with reference to FIGS. 22 and 23, in the first application example right or left turns ahead of the vehicle position are detected by deceleration of the vehicle and the ON state of the blinker. According to an eight modified example, however, a right or left turn can be detected by detecting only the ON state of the blinker. In this case, when the right blinker is detected to be ON, the hysteresis value in the left direction is reduced. Conversely, when the left blinker is detected to be ON, the hysteresis value in the right direction is reduced.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An optical axis controller for at least one headlamp mounted on a vehicle with a steering wheel, the controller comprising:
    a steering angle detecting device operable to detect a steering angle;
    a driving device operable to adjust a light emission direction of the at least one headlamp; and
    a control unit operable to compute a steering angle hysteresis processing value based on the steering angle and the hysteresis value and to compute a desired light emission direction for the headlamps based on the steering angle hysteresis processing value and to control an actual light emission direction of the at least one headlamp to match the desired light emission direction using the driving device;
    wherein the control unit is further operable to compare a first result obtained by subtracting a prescribed steering angle hysteresis processing value from the steering angle to the hysteresis value and to assign a value obtained by subtracting the hysteresis value from the steering angle as the steering angle hysteresis processing value when the first result is equal to or larger than the hysteresis value.

2. The optical axis controller according to claim 1 wherein the control unit is further operable to change the hysteresis value.

3. The optical axis controller according to claim 2 wherein the control unit is further operable to compute a steering angular velocity from the steering angle and to change the hysteresis value based on the steering angular velocity.

4. The optical axis controller according to claim 3 wherein the control unit is further operable to decrease the hysteresis value when an absolute value of the steering angular velocity becomes larger than a prescribed value.

5. The optical axis controller according to claim 3 wherein the control unit is further operable to decrease the hysteresis value as the absolute value of the steering angular velocity increases.

6. The optical axis controller according to claim 2 wherein the control unit is further operable to change the hysteresis value based on a vehicle speed.

7. The optical axis controller according to claim 6 wherein the control unit is further operable to reduce the hysteresis value as the vehicle speed increases.

8. The optical axis controller according to claim 2 wherein the control unit is further operable to judge whether the vehicle is on a substandard road, to compute a steering angular velocity from the steering angle and to increase the hysteresis value as an absolute value of the steering angular velocity becomes larger than a prescribed value when the vehicle is on the substandard road.

9. The optical axis controller according to claim 2 wherein the control unit is further operable to detect an entry of the vehicle into a reverse curve and to change the hysteresis value based on the entry into the reverse curve.

10. The optical axis controller according to claim 9 wherein the control unit is further operable to reduce the hysteresis value as the entry of the vehicle into the reverse curve is detected.

11. The optical axis controller according to claim 9 wherein the control unit is further operable to compute a steering angular velocity from the steering angle and to detect the entry of the vehicle into the reverse curve when the steering wheel passes through a first prescribed steering angle in a right direction with respect to a straight running direction then towards a left direction at a first steering angular velocity with an absolute value larger than a first prescribed value, or when the steering wheel passes through a second prescribed steering angle in the left direction with respect to the straight running direction then towards the right direction at a second steering angular velocity with an absolute value larger than a second prescribed value.

12. The optical axis controller according to claim 11 wherein the second prescribed steering angle is equal to the first prescribed steering angle; and wherein the second prescribed value is equal to the first prescribed value.

13. The optical axis controller according to claim 9 wherein the control unit is further operable to compute a steering angular velocity from the steering angle and to detect the entry into the reverse curve when an absolute value of the steering angular velocity is higher than a prescribed value while the steering angle is within a prescribed range.

14. The optical axis controller according to claim 2 wherein the control unit is further operable to detect a corner ahead of a position of the vehicle and to reduce the hysteresis value pertaining to a direction of the corner when the corner is detected.

15. The optical axis controller according to claim 14 wherein the control unit is further operable to reduce the hysteresis value pertaining to the direction of the corner as a distance from the position of the vehicle to the corner becomes shorter.

16. The optical axis controller according to claim 15 wherein the control unit is further operable to detect the distance and the direction based on the position of the vehicle detected by a navigation system and map data stored in the navigation system.

17. The optical axis controller according to claim 14 wherein the control unit is further operable to decrease the hysteresis value as a time required for the vehicle to reach the corner becomes shorter.

18. The optical axis controller according to claim 17 wherein the control unit is further operable to determine the time required for the vehicle to reach the corner based on a position of the vehicle detected by a navigation system and map data stored in the navigation system.

19. The optical axis controller according to claim 2 wherein the control unit is further operable to detect a right or a left turn direction of the vehicle based on blinker operation and to decrease the hysteresis value pertaining to the detected right or the detected left turn direction.

20. The optical axis controller according to claim 19, further comprising:
    means for detecting deceleration of the vehicle; and
        wherein the control unit is further operable to detect a right or a left turn direction of the vehicle when the deceleration is larger than a prescribed value.

21. The optical axis controller according to claim 1 wherein the control unit is further operable to compute the desired light emission direction as a constant direction based on the steering angle when the steering angle varies within a hysteresis range having a hysteresis width value around a prescribed value computed based on the steering angle and to compute the desired light emission direction according to only the steering angle when the steering angle falls out of the hysteresis range until the steering angle changes in a direction of returning to the hysteresis range.

22. The optical axis controller according to claim 1, further comprising:
a vehicle speed detecting device that detects a vehicle speed; and wherein the control unit is further operable to compute the desired light emission direction based on the vehicle speed.

23. The optical axis controller according to claim 1 wherein the control unit is further operable to compute a steering angular velocity from the steering angle and to compute the desired light emission direction based on the steering angular velocity.

24. The optical axis controller according to claim 1 wherein the control unit is further operable to compare a second result obtained by subtracting the steering angle from the prescribed steering angle hysteresis value to the hysteresis value and to assign a sum of the steering angle and the hysteresis value as the steering angle hysteresis processing value when the first result is smaller than the hysteresis value and the second result is larger than the hysteresis value.

25. The optical axis controller according to claim 1 wherein the control unit is further operable to compare a second result obtained by subtracting the steering angle from the prescribed steering angle hysteresis value to the hysteresis value and to assign the prescribed steering angle hysteresis processing value as the steering angle hysteresis processing value when the first result is smaller than the hysteresis value and the second result is equal to or smaller than the hysteresis value.

26. An optical axis controller for at least one headlamp mounted on a vehicle with a steering wheel, the controller comprising:
a steering angle detecting device operable to detect a steering angle;
a driving device operable to adjust a light emission direction of the at least one headlamp; and
a control unit operable to compute a desired light emission direction for the headlamps based on the steering angle and a hysteresis value and to control an actual light emission direction of the at least one headlamp to match the desired light emission direction using the driving device;
wherein the control unit is further operable to detect an entry of the vehicle into a reverse curve, to compute a steering angle hysteresis processing value based on the steering angle and the hysteresis value, to compute a steering angle offset processing value based on the steering angle hysteresis processing value, an offset value and an entry direction of the reverse curve and to compute the desired light emission direction based on the steering angle offset processing value.

27. The optical axis controller according to claim 26 wherein the control unit is further operable to select a value obtained by subtracting the offset value from the steering angle hysteresis processing value as the steering angle offset processing value when the entry of the vehicle into the reverse curve is detected and the steering angle decreases and to otherwise select the steering angle hysteresis processing value as the steering angle offset processing value.

28. The optical axis controller according to claim 26 wherein the control unit is further operable to compute a steering angular velocity from the steering angle; and wherein the offset value increases as the absolute value of the steering angular velocity increases.

29. The optical axis controller according to claim 26 wherein the control unit is further operable to select a sum of the steering angle hysteresis processing value and the offset value as the steering angle offset processing value when the entry of the vehicle into the reverse curve is detected and the steering angle increases and to otherwise select the steering angle hysteresis processing value as the steering angle offset processing value.

30. The optical axis controller, according to claim 29 wherein the control unit is further operable to compute a steering angular velocity from the steering angle; and wherein the offset value increases as an absolute value of the steering angular velocity increases.

31. The optical axis controller according to claim 1 wherein the control unit is further operable to detect an entry of the vehicle into a reverse curve, to compute a steering angle offset processing value based on the steering angle and the entry of the vehicle into the reverse curve, to compute the steering angle hysteresis processing value based on the steering angle offset processing value and the hysteresis value and to compute the desired light emission direction based on the steering angle hysteresis processing value.

32. The optical axis controller according to claim 31 wherein the control unit is further operable to select a value obtained by subtracting the offset value from the steering angle as the steering angle offset processing value when the entry into the reverse curve is detected and the steering angle decreases and otherwise to select the steering angle as the steering angle offset processing value.

33. The optical axis controller according to claim 31 wherein the control unit is further operable to select a sum of the steering angle and the offset value as the steering angle offset processing value when the entry into the reverse curve is detected and the steering angle increases and otherwise to select the steering angle as the steering angle offset processing value.

34. The optical axis controller according to claim 31 wherein the control unit is further operable to compare a result obtained by subtracting a prescribed steering angle hysteresis processing value from the steering angle offset processing value to the hysteresis value and to assign a value obtained by subtracting the hysteresis value from the steering angle offset processing value as the steering angle hysteresis processing value when the result is equal to or larger than the hysteresis value.

35. The optical axis controller according to claim 31 wherein the control unit is further operable to compare a first result obtained by subtracting a prescribed steering angle hysteresis processing value from the steering angle offset processing value to the hysteresis value and to compare a second result obtained by subtracting the steering angle offset processing value from the prescribed steering angle hysteresis value to the hysteresis value and to assign a sum of the steering angle offset processing value and the hysteresis value as the steering angle hysteresis processing value when the first result is smaller than the hysteresis value and the second result is larger than the hysteresis value.

36. The optical axis controller according to claim 31 wherein the control unit is further operable to compare a first result obtained by subtracting a prescribed steering angle hysteresis processing value from the steering angle offset, processing value to the hysteresis value and to compare a second result obtained by subtracting the steering angle offset processing value from the prescribed steering angle hysteresis value to the hysteresis value and to assign the prescribed steering angle hysteresis processing value as the steering angle hysteresis processing value when the first result is smaller than the hysteresis value and the second result is equal to or smaller than the hysteresis value.

37. A method of controlling an optical axis of at least one headlamp of a vehicle, comprising:
   detecting a steering angle of the vehicle;
   computing a steering angle hysteresis processing value based on the steering angle and the hysteresis value; wherein the steering angle hysteresis processing value is equal to the steering angle minus the hysteresis value when the steering angle minus a prescribed steering angle hysteresis processing value is greater than or equal to the hysteresis value;
   computing a desired light emission direction of the at least one headlamp based on the steering angle hysteresis processing value; and
   controlling an actual light emission direction of the at least one headlamp to match the desired light emission direction.

38. The method according to claim 37, further comprising:
   detecting a vehicle speed of the vehicle; and wherein computing the desired light emission direction further comprises computing the desired light emission direction based on the vehicle speed and the steering angle hysteresis processing value.

39. The method according to claim 37, further comprising:
   detecting an entry of the vehicle into a reverse curve; and wherein computing the desired light emission direction includes computing the desired light emission direction based on the steering angle hysteresis processing value and the entry of the vehicle into the reverse curve.

40. The method according to claim 37, further comprising:
   detecting an entry of the vehicle into a reverse curve; and
   computing a steering angle offset processing value based on the steering angle hysteresis processing value, an offset value, and the entry of the vehicle into the reverse curve; and wherein computing the desired light emission direction includes computing the desired light emission direction based on the steering angle offset processing value.

41. The method according to claim 37, further comprising:
   detecting an entry of a reverse curve by the vehicle;
   computing a steering angle offset processing value based on the steering angle, an offset value and the entry of the reverse curve;
   wherein computing the steering angle hysteresis processing value includes computing the steering angle hysteresis processing value based on the steering angle offset processing value and the hysteresis value.

42. The method according to claim 37, further comprising:
   detecting a corner ahead of a position of the vehicle; and
   computing a reduced corner hysteresis value pertaining to a direction of the corner when the corner is detected.

43. The method according to claim 37, further comprising:
   detecting a turn of the vehicle using blinker operation; and
   computing a reduced turn hysteresis value pertaining to a direction of the turn when the turn is detected.

* * * * *